United States Patent
Barth et al.

(10) Patent No.: US 9,473,580 B2
(45) Date of Patent: Oct. 18, 2016

(54) SYSTEM AND ASSOCIATED METHODOLOGY FOR PROXIMITY DETECTION AND DEVICE ASSOCIATION USING ULTRASOUND

(71) Applicant: Cisco Technology, Inc., San Jose, CA (US)

(72) Inventors: Ragnvald Barth, Oslo (NO); Sverre Huseby, Lysaker (NO); Johan Ludvig Nielsen, Oslo (NO); Dan Peder Eriksen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 691 days.

(21) Appl. No.: 13/861,860

(22) Filed: Apr. 12, 2013

(65) Prior Publication Data

US 2014/0164629 A1  Jun. 12, 2014

Related U.S. Application Data

(60) Provisional application No. 61/734,166, filed on Dec. 6, 2012.

(51) Int. Cl.
*H04L 29/08* (2006.01)
*H04B 11/00* (2006.01)
*H04B 1/69* (2011.01)

(52) U.S. Cl.
CPC ............ *H04L 67/141* (2013.01); *H04B 11/00* (2013.01); *H04B 2001/6912* (2013.01)

(58) Field of Classification Search
None
See application file for complete search history.

(56) References Cited

U.S. PATENT DOCUMENTS

| | | | |
|---|---|---|---|
| 2002/0065663 A1 | 5/2002 | Thomas et al. | |
| 2002/0107596 A1 | 8/2002 | Thomas et al. | |
| 2002/0152314 A1* | 10/2002 | Hayek | G04G 21/00 709/227 |
| 2006/0158956 A1* | 7/2006 | Laugharn | B01F 11/02 366/127 |
| 2008/0183716 A1 | 7/2008 | Hayek et al. | |

(Continued)

FOREIGN PATENT DOCUMENTS

| | | |
|---|---|---|
| CN | 1380760 A | 11/2002 |
| CN | 1659505 A | 8/2005 |

(Continued)

OTHER PUBLICATIONS

Cristina Videira Lopes, et al., "Aerial Acoustic Communications," IEEE Workshop on Applications of Signal Processing to Audio and Acoustics, New Paltz, New York, Oct. 21-24, 2001, pp. 219-222.

(Continued)

*Primary Examiner* — Hassan Kizou
*Assistant Examiner* — Hashim Bhatti
(74) *Attorney, Agent, or Firm* — Lempia Summerfield Katz LLC

(57) ABSTRACT

In one embodiment, a method includes receiving ultrasound frequency sweeps in a sound receiving device. Each of the plurality of ultrasound frequency sweeps is centered on one of at least two predetermined frequencies. The method also includes converting the ultrasound frequency sweeps into an ultrasound message based on a central frequency of each of the ultrasound frequency sweeps received, and placing the ultrasound message into a receive buffer. Then at least a network address is extracted from the ultrasound message, and the network address is used to establish a communication session over a data network with a telecommunications device.

20 Claims, 18 Drawing Sheets

(56) References Cited

U.S. PATENT DOCUMENTS

| | | | |
|---|---|---|---|
| 2009/0180518 A1* | 7/2009 | Ishii | H04B 1/7172 375/130 |
| 2009/0233582 A1 | 9/2009 | Suzuki et al. | |
| 2011/0179182 A1 | 7/2011 | Ravnas | |
| 2011/0285244 A1* | 11/2011 | Lewis | B06B 1/023 310/317 |
| 2012/0051187 A1* | 3/2012 | Paulson | H04B 1/06 367/135 |
| 2014/0003823 A1* | 1/2014 | Roberts | H04B 10/116 398/187 |

FOREIGN PATENT DOCUMENTS

| | | | | |
|---|---|---|---|---|
| CN | 101228808 A | 7/2008 | | |
| CN | 102273106 A | 12/2011 | | |
| EP | 1 906 696 A1 | 4/2008 | | |
| EP | 1906696 A1 * | 4/2008 | | H04M 1/2155 |
| WO | WO 2011/087370 A1 | 7/2011 | | |

OTHER PUBLICATIONS

Rene Mayrhofer, et al., "On the Security of Ultrasound as Out-of-band Channel," Computing Department, Lancaster University, 6 pages.

Tim Kindberg, et al., "Validating and Securing Spontaneous Associations between Wireless Devices," Mobile and Media Systems Laboratory, HP Laboratories Palo Alto, HPL-2002-256, Sep. 12, 2002, pp. 1-6 with cover page.

Video Conferencing Equipment and Services for Installation & Maintenance—Cisco Tandberg, Polycom, LifeSize, Sony, ZTE, Vaddio, VFI, Polycom PowerCam Presenter, http://www.1pcn.com/videoconferencing/powercam%20presenter/index.htm, Oct. 20, 2010, 3 pages.

Sverre Holm, et al., "Indoors Data Communications Using Airborne Ultrasound," IEEE Int. Conf. on Acoust., Speech, Sign. Proc., Philadelphia, PA, USA, Mar. 19-23, 2005, pp. 1-4.

Daniel B. Kilfoyle, et al., "The State of the Art in Underwater Acoustic Telemetry," IEEE Journal of Oceanic Engineering, vol. 25, No. 1, Jan. 2000, pp. 4-27.

Chirp—Wikipedia, the free encyclopedia, http://en.wikipedia.org/wiki/Chirp, last modified on Dec. 2, 2012, 5 pages.

Chirp spread spectrum—Wikipedia, the free encyclopedia, http://en.wikipedia.org/wiki/Chirp_spread_spectrum, last modified on Nov. 13, 2012, 3 pages.

Matched filter—Wikipedia, the free encyclopedia, http://en.wikipedia.org/wiki/Matched_filter, last modified on Feb. 1, 2013, 7 pages.

Error Detection and Error Correction Algorithm, Stack Overflow, http://stackoverflow.com/questions/7301145/error-detection-and-error-correction-algorithm, 3 pages.

International Search Report and Written Opinion issued Apr. 17, 2014 in PCT/US2013/073314 filed Dec. 5, 2013.

International Preliminary Report on Patentability, from PCT/US2013/073314, Jun. 18, 2015, WO.

Chinese Office Action for related Chinese Application No. 201380063776.1 dated May 4, 2016, with English Translation.

* cited by examiner

Figure 3
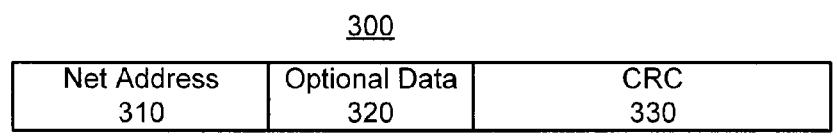
Figure 4
Figure 5
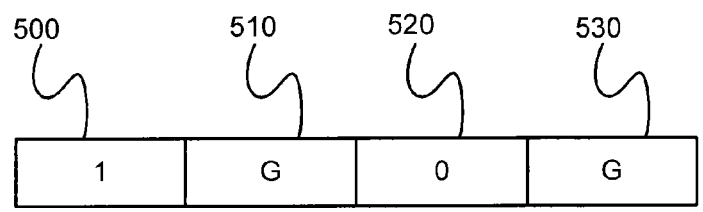
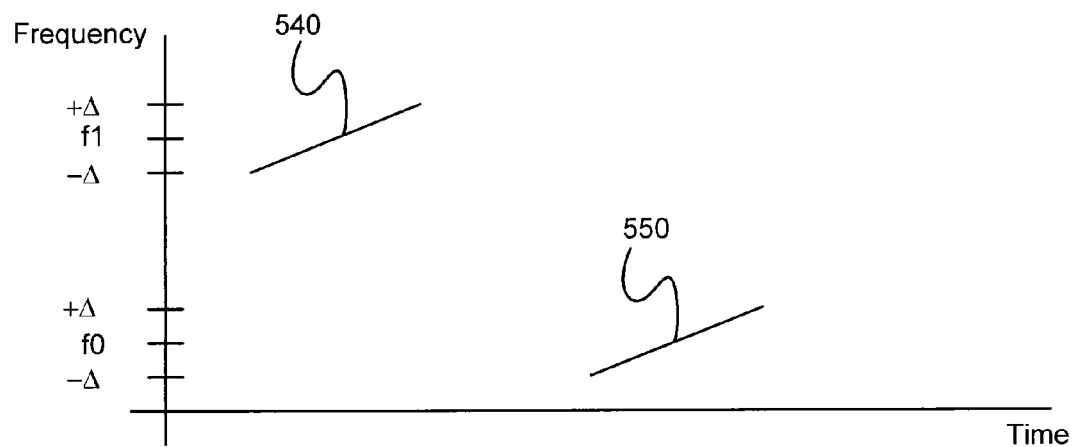

Figure 15

Multi-Lane Buffer
900, 1000, 1100

| | 1 | 2 | 3 | 4 | 5 | 6 | 7 | 8 | 9 | 10 | 11 | 12 |
|---|---|---|---|---|---|---|---|---|---|---|---|---|
| Lane A | B 1505 | B 1510 | B 1515 | B 1520 | G 1525 | G 1530 | G 1535 | G 1540 | B | B | B | B |
| Lane B | | B | B 1545 | B 1550 | G 1555 | G 1560 | G 1565 | G 1570 | B 1575 | B 1580 | B | B |
| Lane C | B | B | B | B | G 1585 | G 1590 | G 1595 | G 1600 | B 1605 | B 1610 | B 1615 | B 1620 |

Samples

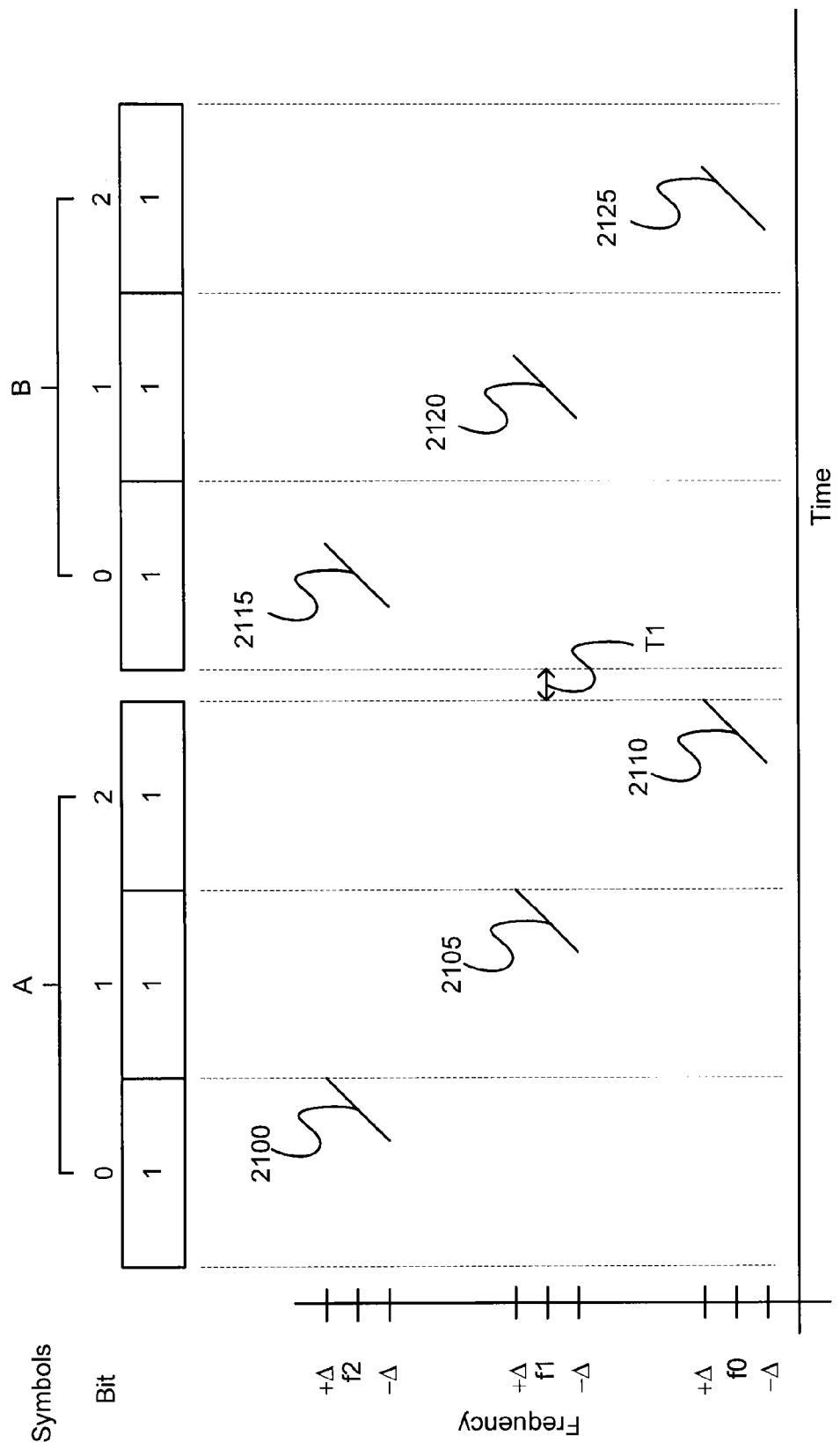

SYSTEM AND ASSOCIATED METHODOLOGY FOR PROXIMITY DETECTION AND DEVICE ASSOCIATION USING ULTRASOUND

CROSS-REFERENCE TO RELATED APPLICATION

This application claims the benefit of priority to U.S. Provisional Application No. 61/734,166 entitled, "Proximity Detection using Ultra Sound," and filed Dec. 6, 2012.

The present disclosure relates generally to a system and associated methodology for using ultrasound communication to detect the presence of a device in a room including a telecommunications device and for establishing a communication between the device and the communication system.

BACKGROUND

Teleconferencing and telepresence systems allow meetings between persons or groups of people situated at different locations. These systems may provide both video and audio, and may be installed in rooms dedicated to teleconferencing. People that have personal electronic devices, such as cell phones, tablet computers, laptop computers and the like may connect their device to a teleconferencing system that has been installed in a dedicated teleconferencing room.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is an example of a message structure of an ultrasound message according exemplary aspects of the present disclosure;

FIG. 4 is an example transmission arrangement for transmitting ultrasound messages according to exemplary aspects of the present disclosure;

FIG. 5 is a diagram relating message bit information to transmitted ultrasound frequencies according to exemplary aspects of the present disclosure;

FIG. 15 is a diagram of a multi-lane buffer according to exemplary embodiments of the present disclosure;

FIG. 21 is a diagram of timing adjustment according to exemplary aspects of the present disclosure.

DESCRIPTION OF EXAMPLE EMBODIMENTS

Overview

Figure 1:
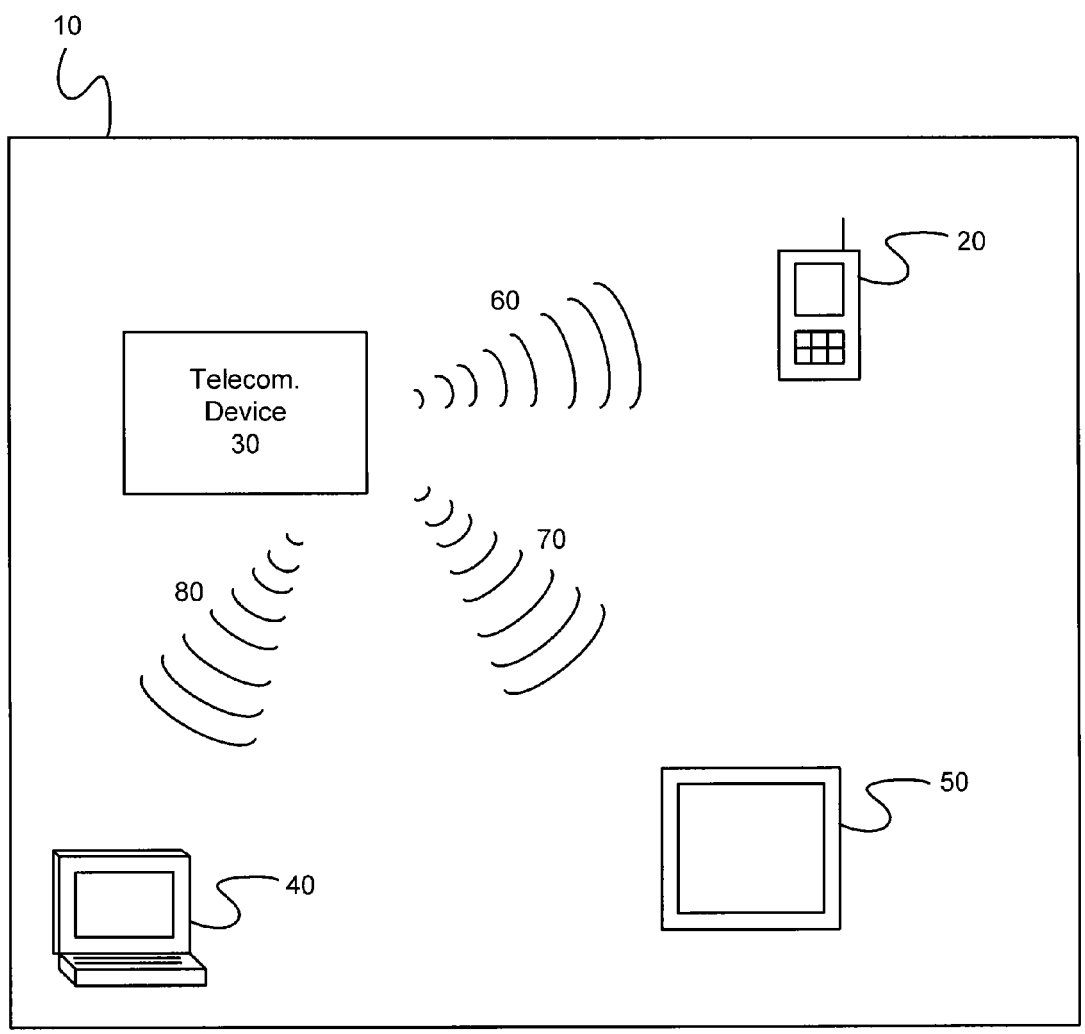
FIG. 1 is a plan view of a teleconferencing room including a teleconferencing system according to exemplary aspects of the present disclosure.

A method includes receiving ultrasound frequency sweeps in a sound receiving device. Each of the plurality of ultrasound frequency sweeps is centered on one of at least two predetermined frequencies. The method also includes converting the ultrasound frequency sweeps into an ultrasound message based on a central frequency of each of the ultrasound frequency sweeps received, and placing the ultrasound message into a receive buffer. Then at least a network address is extracted from the ultrasound message, and the network address is used to establish a communication session over a data network with a telecommunications device.

Example Embodiments

Referring now to the drawings, wherein like reference numerals designate identical or corresponding parts throughout the several views.

FIG. 1 is a diagram of a room 10 that includes a telecommunications device 30 for establishing and carrying out teleconference and videoconference meetings. The room 10 also includes personal electronic devices, such as a smart phone 20, a tablet computer 50 and a laptop computer 40, which are brought into the room 10 by the conference attendees. Unless otherwise noted, the personal electronic devices, such as the smart phone 20, the laptop computer 40 and the tablet computer 50 are collectively referred to herein as "terminal devices" or the "terminal device."

The conference attendees may wish to connect their terminal devices to the telecommunications device 30 in order to receive conference video and/or audio via the terminal device, or to have a built-in microphone and/or video camera capture their respective video and/or audio for transmission by the telecommunications device 30 to the remote party, which is situated at some other location other than room 10. The conference attendees may also wish to use their respective terminal devices to control the telecommunications device 30 by, for example, establishing a teleconferencing session, adding participants, removing participants, sharing documents and setting communication parameters. Other uses for a terminal device that is connected to the telecommunications device 30 are also possible without departing from the scope of the present disclosure.

In order to establish a communication with the terminal devices, the telecommunications device 30 transmits ultrasound messages using, for example, ultrasound waves 60, 70 and 80. Although separate ultrasound waves 60, 70, 80 are shown, each sound wave 60, 70, 80 carries the same message. The ultrasound messages include a network address of the telecommunications device 30 and are coded as will be described below. When a terminal device, such as the smart phone 20 for example, receives the ultrasound message, it decodes it as will be explained below in order to extract the network address of the telecommunications device 30. Then the smart phone 20 uses the network address received in the ultrasound message to establish a communications session with the telecommunications device 30 via a data network, such as a TCP/IP network for example. Once the communications session is established, the smart phone 20 may be used to perform any of the functions described above. This process may also be performed by the laptop computer 40, the tablet computer 50 or any other terminal device brought into room 10 without departing from the scope of the present disclosure.

Further, the ultrasound messages do not pass through the walls of the room 10, which prevents parties not in the room 10 itself from detecting the network address of the telecommunications device 30 and joining a teleconference without authorization. Thus, transmitting the network address of the telecommunications device 30 ultrasonically provides a layer of security as only those physically within room 10 can detect the network address of the telecommunications device 30.

One of ordinary skill would recognize that additional security measures are also possible without departing from the scope of the present disclosure. For example, the communication session between the terminal device and the telecommunications device 30 may be established using a secure sockets layer (SSL) or Internet protocol security (IPsec). The network address transmitted in the ultrasound message may also be encrypted using symmetric or asymmetric encryption, and an additional coded value, with which the terminal device must respond, may be added to the ultrasound message. Further, the terminal device may also challenge the authenticity of the telecommunications device 30 by responding with an encrypted value that must be transmitted back to the terminal device in its original, unencrypted state. Thus, the particular examples of the ultrasound message and the communication session described herein are merely exemplary.

Figure 2:
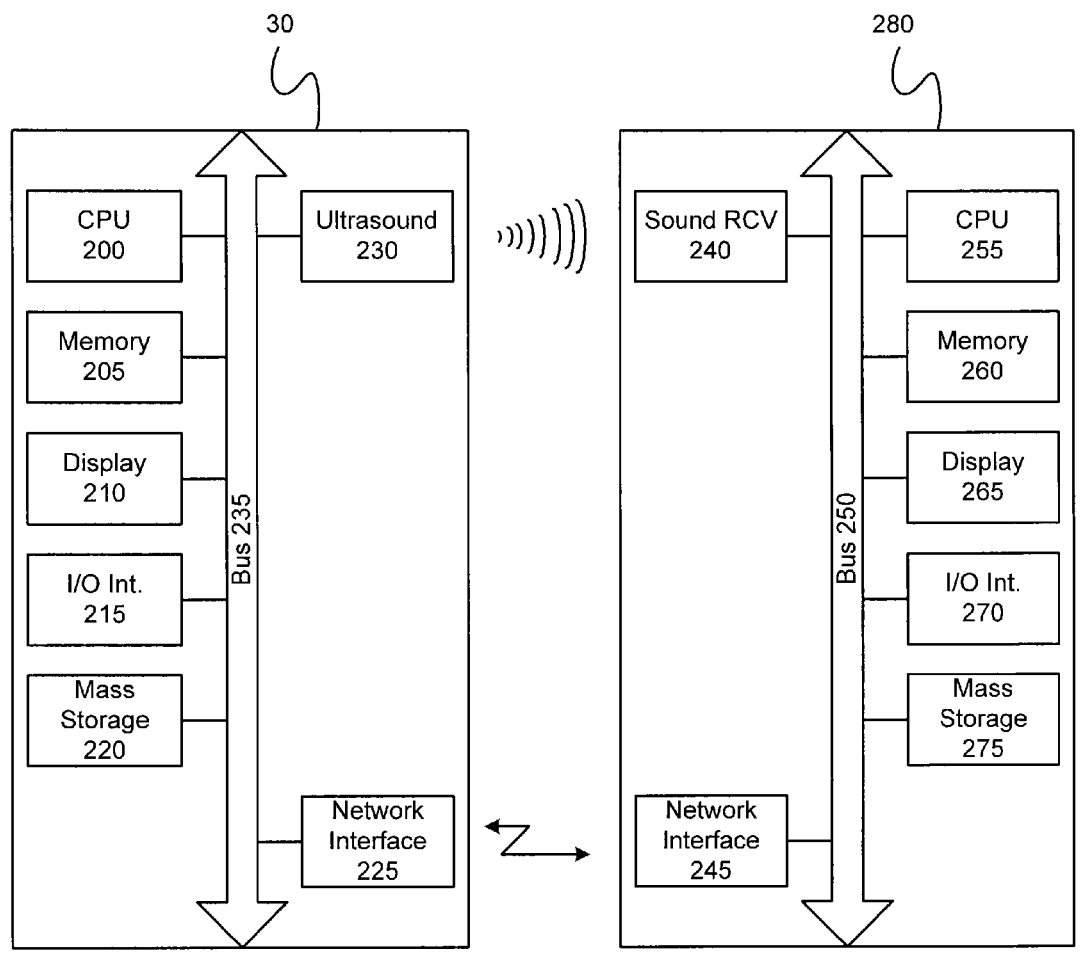
FIG. 2 is a block diagram of example hardware configurations of a telecommunications device and a terminal device according to aspects of the present disclosure.

FIG. 2 is a schematic diagram of exemplary hardware components for both the telecommunications device 30 and a terminal device 280. As noted above, the terminal device 280 may be any personal electronic device, such as the smart phone 20, the tablet computer 50 and the laptop computer 40. As can be appreciated, only components necessary for the description of the exemplary embodiments are illustrated. However, each of the telecommunications device 30 and the terminal device 280 may include additional hardware and software components without departing from the scope of the present disclosure.

In FIG. 2, the telecommunications device 30 includes a central processing unit (CPU) 200, which may be a processor circuit such as a Core i5 or a Core i7 processor from Intel Corp., or FX, Phenom II, Athlon II or Sempron processors from AMD Corp. The CPU 200 may also be a reduced instruction set processor, such as an ARM Cortex A8, may be implemented as an application specific integrated circuit (ASIC) or in a field programmable gate array (FPGA), complex programmable logic device (CPLD) or using discrete logic circuitry. In addition, the CPU 200 may run an operating system, such as Windows 7, MAC OS X, Linux, Unix or DOS, or may run a custom program to execute the functions described herein, as one of ordinary skill would recognize.

The CPU 200 is connected to memory 205 via a bus 235. The memory 205 may include static and/or dynamic random access memory (RAM) as well as read only memory (ROM). Memory 205 may also include erasable programmable read only memory (EPROM), electrically erasable programmable read only memory (EEPROM) or flash memory, and at least a portion of the memory 205 may be removable. Memory 205 stores the instructions, subroutines, data and other code executed by the CPU 200 to perform the functions described herein as well as additional functions that may be performed by the telecommunications device 30. The bus 235 may be a serial bus, a parallel bus or a network bus, such as Ethernet, as would be recognized by one of ordinary skill.

A display 210, such as a plasma display, liquid crystal display (LCD), cathode ray tube (CRT), or light emitting diode display, for example an organic LED (OLED) display, is also connected to the CPU 200 via the bus 235 in order to display video relating to a teleconference, as well as to display control information for controlling the telecommunications device 30. An input/output (I/O) interface 215 is also connected to the bus 235 in order to connect to external peripherals, such as a keyboard, mouse, printer, scanner, microphones, speakers, and the like. As such, the I/O interface 215 may include serial, parallel, HDMI, USB and other I/O connections.

A mass storage unit 220 is connected to the CPU 200 via the bus 235 in order to store information and data for setting up and managing teleconference sessions. As such, the mass storage unit 220 may include an optical disc drive, a hard disc drive, a solid state drive or even a remote server or other computer. The network interface 225 is connected to the bus 235 in order to allow network communication over data networks such as a TCP/IP network. For example, the network interface 225 may connect the telecommunications device 30 to a local area network (LAN) a wide area network (WAN) or the Internet. Further, the network interface 225 need not be a wired interface, and can also establish network connections via Wifi, Wi-Max and cellular networks, such as EDGE, 3G, 4G and 4G LTE. The network interface 225 may also establish network connections via Bluetooth and Zigby radio networks without departing from the scope of the present disclosure.

The ultrasound unit 230 is connected to the CPU 200 via the bus 235 and emits ultrasound sound waves, such as when transmitting the ultra sound message described above. As such, the ultrasound unit 230 may be a speaker, piezo electric speaker or other sound transducer. The ultrasound unit 230 may also include the electronic circuitry necessary for driving the speaker, such as amplifiers, filters, coils, etc. The particular make-up of the ultrasound unit 230 in no way limits the present disclosure.

Next, the terminal device 280 is described with reference to FIG. 2. As discussed above, the terminal device 280 may be any electronic device that a conference attendee may bring into the room 10 or that may already be in the room 10 for an attendee's use. Examples of the terminal device 280 are the smart phone 20, the tablet computer 50 and the laptop computer 40. Other electronic devices are also possible without departing from the scope of the present disclosure, however.

In FIG. 2, the terminal device includes a CPU 255 connected to memory 260, display 265, I/O interface 270 and mass storage unit 275 via the bus 250. The CPU 255 may be any of the circuits and devices described above with regard to CPU 200, such as the Core i5, Core i7, FX, Phenom II, Athlon II, Sempron, or ARM Cortex A8 processors, or may be implemented using an ASIC, FPGA or discrete logic circuitry. The memory 260 may also be any combination of static and/or dynamic RAM, ROM, EPROM, EEPROM and flash memory—a portion of which may be removable—without departing from the scope of the present disclosure. Further, the I/O interface 270, mass storage unit 275, network interface 245 and bus 250 may be any of the ones described above with respect to the telecommunications device 30 and therefore further description of these circuits is omitted for the sake of brevity.

The terminal device 280 also includes a sound receiving unit 240 in order to receive sounds, such as voice, as well as the ultrasound message transmitted by the ultrasound unit 230 of the telecommunications device 30. As such the sound receiving unit 240 may be a microphone or other sound transducer and associated circuitry, such as amplifiers, filters, analog-to-digital converters, automatic gain control circuits and the like. The sound receiving unit 240 of the terminal device may receive sounds in the audible frequency range of 20 Hz to about 22 kHz. However, the sound receiving unit 240 may also receive higher and/or lower frequencies without departing from the scope of the present invention.

In FIG. 2, the ultrasound communication between the telecommunications device 30 and the terminal device 280 is illustrated as being in one direction, i.e., from the telecommunications device 30 to the terminal device 280. However, bidirectional ultrasound communication is also possible. Further, the ultrasound communication via the ultrasound unit 230 of the telecommunications device 30 and the sound receiving unit 240 of the terminal device 280 may be performed in parallel with the network communication over network interfaces 225 and 245 of the telecommunications device 30 and the terminal device 280, respectively. Thus, the repetition interval of the ultrasound message is independent of the communication through the data network and vice versa. Also, though communication between the telecommunications device 30 and a single terminal device 280 is shown in FIG. 2, the telecommunications device may simultaneously communicate with any number of terminal devices 280 without departing from the scope of the present disclosure.

FIG. 3 is an example of the structure of an ultrasound message according aspects of the disclosure. In FIG. 3, the ultrasound message 300 includes the network address 310 of the telecommunications device 300, optional data 320 and a cyclic redundancy check (CRC) code 330. The network address 310 may be an internet protocol (IP) address, media access control address, uniform resource locator (URL) or any other network address that identifies the telecommunications device 30 on a data network. The optional data 320 may include encryption information, such as an encryption key, a random number code, parameter setting information and the like. The optional data 320 may be omitted in certain exemplary embodiments. The CRC code 330 is generated from the network address 310 and the option data 320, if included, and appended to the ultrasound message 300 in order to provide error checking. As such, the CRC code 330 may be generated by any method known in the art without departing from the scope of the present disclosure.

The ultrasound message 300 in FIG. 3 is broadcast via the ultrasound unit 230 as sound waves 60, 70 and 80, for example, and does not need any header information identifying a recipient device. However, such header information may be added without departing from the scope of the present disclosure. The order in which the network address 310, optional data 320 and CRC code 330 may also be varied, as one of ordinary skill would recognize.

FIG. 4 illustrates a sample transmission of the ultrasound message 300 by the ultrasound unit 230 of the telecommunications device 30. In FIG. 4, the ultrasound message 300 is repeated back-to-back in order to generate a substantially continuous ultrasound transmission. The length of the a single ultrasound message 300 may be predefined and fixed such that the ultrasound message 300 repeats at a predetermined interval though the ultrasound transmission may be a substantially continuous stream of bits. FIG. 4 illustrates three repetitions of the ultrasound message 300, but of course many more repetitions are possible in order to generate a continuous stream of bits. Further, a pause or guard interval may be inserted between successive transmissions of the ultrasound message 300, or the ultrasound message 300 may be transmitted in bursts of a predetermined number of repetitions. As such, the transmission of the ultrasound message 300 illustrated in FIG. 4 is merely exemplary and does not limit the present disclosure.

Next, FIG. 5 illustrates transmission of each bit of the ultrasound message 300 according to exemplary aspects of the present disclosure. In FIG. 5, guard intervals 510 and 530 are inserted between the bits 500 and 530 to minimize distortion from, for example, reflections within the room 10 and reverberations. During the guard intervals 510 and 530, the ultrasound unit 230 transmits no ultrasound waves. Since the duration of each bit transmission may be fixed at a predetermined value, such as 20 ms, the guard intervals 510 and 530 may also have a fixed duration of the same predetermined value. However, the guard intervals 510 and 530 may also have a duration that is different from the duration of the bits 500 and 520, for example longer or shorter durations, and may also be omitted in an application where reflections and/or reverberations do cause significant distortion. The guard intervals 510 and 530 may also have different durations from one to the other, or may all have a same duration. As can be appreciated, the illustration of two bits 500 and 520 and two guard intervals 510 and 530 in FIG. 5 is merely exemplary and many more bits 500, 520 and guard intervals 510, 530 may be assembled together in a substantially continuous stream of bits in order to achieve the ultrasound message 300 transmission pattern of FIG. 4.

As illustrated in FIG. 5, a sweep centered on a predefined frequency is generated for each bit 500, 520. For example, bit 500, having a value of one, is transmitted as a frequency sweep centered on the frequency f1, and bit 520, having a value of zero, is transmitted as a frequency sweep centered on the frequency f0. In FIG. 5, the frequency f1 is higher than the frequency f0, but this is only exemplary. Frequency f0 may also be higher than frequency f1 without departing from the scope of the present disclosure.

In order to generate the frequency sweeps respectively centered on the frequencies f1 and f0, a frequency offset $\Delta$ A is used. For example, the frequency sweep 540, which corresponds to the bit 500, is generated as (f1−$\Delta$, f1+$\Delta$), and the frequency sweep 550, which corresponds to the bit 530, is generated as (f0−$\Delta$, f0+$\Delta$). Although in FIG. 5 the frequency sweeps 540 and 550 ascend in frequency, the frequency sweeps in FIG. 5 may also descend in frequency with time without departing from the scope of the present disclosure. Further, f1 may be 21.5 kHz, f0 may be 20.8 kHz and the frequency offset Δ may be 350 Hz. Of course, other values are also possible for these parameters as long as the frequency sweeps are inaudible to humans but detectable by the terminal device 280 without any modification thereto. The frequency sweeps 540, 550 may also have the same duration of, for example 20 ms, or any other longer or shorter duration as would be recognized by one of ordinary skill. To minimize spectral leakage, each frequency sweep 540, 550 may be windowed using a windowing functions, such as a Blackman window.

Figure 6:
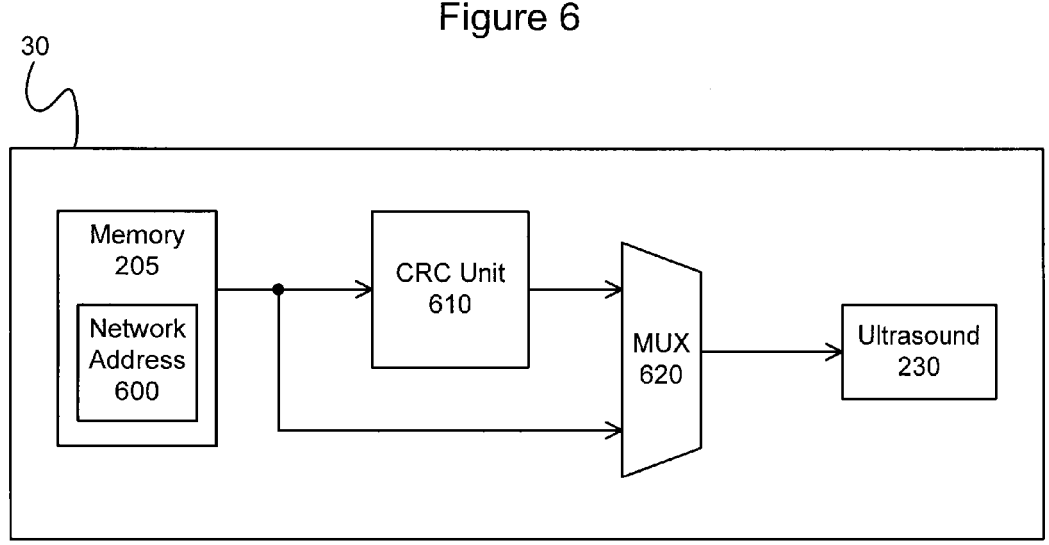
FIG. 6 is a block diagram of the telecommunication device according to exemplary aspects of the present disclosure.

FIG. 6 is a functional diagram of the telecommunications device 30 according to exemplary aspects of the present disclosure. FIG. 6 illustrates functional blocks used to generate the ultrasound message 300. However, the telecommunications device 30 may include many other functional blocks to perform additional processes, such as data communications over the data network, video processing, audio processing in addition to generation of the ultrasound message 300, and spectral shaping, as one of ordinary skill would recognize. These functional blocks are not illustrated in FIG. 6 for the sake of brevity but their absence should not be interpreted as being in any way limiting of the present disclosure.

In FIG. 6, the memory 205 includes a network address storage area 600 in which the network address 310 of the telecommunications device 30 is stored. When an ultrasound message 300 is to be generated, the network address 310 is supplied to both a CRC unit 610 in order to generate the corresponding CRC code 330 and to a multiplexer 620, which is controlled by the CPU 200 of the telecommunications device 30, for example. The multiplexer 620 assembles the ultrasound message 300 by concatenating the CRC code 330 with the network address 310. Of course, the multiplexer 620 may also concatenate the any optional data 320 to the network address 310 and the CRC code 330, which would also be generated by the CRC unit 610 based on the optional data 320 in addition to the network address 310. The order in which the network address 310, CRC code 330 and optional data 320, if any, is concatenated may be changed without departing from the scope of the present invention.

Once the network address 310, CRC code 330 and the optional data 320, if any, is concatenated into the ultrasound message 300, the ultrasound message 300 is supplied to the ultrasound unit 230 where it is converted into frequency sweeps 540, 550 as described below, and transmitted.

Figure 7:
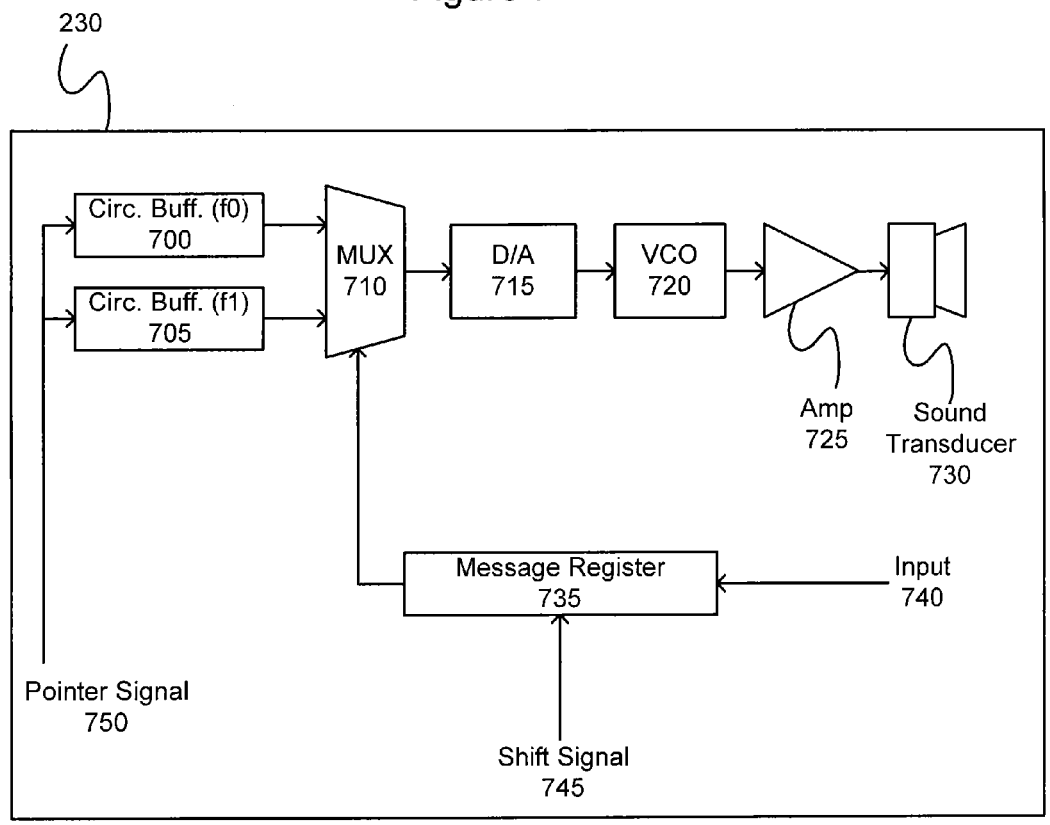
FIG. 7 is a block diagram of the ultrasound unit of the telecommunications device according to exemplary aspects of the present disclosure.

FIG. 7 is a diagram of the ultrasound unit 230 of the telecommunications device 30 according to exemplary aspects of the present disclosure. In FIG. 7, the ultrasound message 300 generated by the multiplexer 620 is received at an input 740 of a message register 735 where it is stored. The message register 735 may be a shift register in which into which the ultrasound message 300 is shifted in serially, or into which the entire ultrasound message is loaded in parallel. Once in the message register 735, the ultrasound message is shifted out of the message register 735 bit by bit through the application of a shift signal 745 controlled by the CPU 200. As such, the message register is one bit wide by as many bits long as a single instance of the ultrasound message 300. However, the message register 735 may also be longer than the ultrasound message 300, or may be shorter than the ultrasound message 300 when acting as a first-in-first-out (FIFO) buffer between the multiplexer 620 and the multiplexer 710.

The ultrasound unit 230 may also include two circular buffers 700, 705. The circular buffer 700 corresponds to the frequency f1 and the circular buffer 705 corresponds to the frequency f0. As noted above, the frequency f1 may correspond to a logic one and the frequency f0 may correspond to a logic 0. Each of the circular buffers 700, 705 may be as wide as a bit resolution of the digital-to-analog (D/A) converter 715 discussed below, and may have a length sufficient to store a desired number of frequency steps for each of the sweeps 540, 550 of FIG. 5. For example, if the D/A converter 715 has a 32-bit resolution and the frequency sweeps 540, 550 are to have 7 steps, i.e., the sweeps increase in 100 Hz steps when the frequency offset Δ is 350 Hz, each of the circular buffers 700, 705 may be 32×7 bits. However, as one of ordinary skill would recognize any number the circular buffers 700, 705 may be of any width and length in order to generate a desired frequency sweep as explained below without departing from the scope of the present disclosure.

Each circular buffer 700, 705 is preloaded with a number of sample values, each corresponding to a particular voltage to be generated by the D/A converter 715. A particular value is outputted by each circular buffer 700, 705 upon receipt of a pointer signal 750 from, for example, the CPU 200. The values output by the circular buffers 700, 705 are provided to the multiplexer 710 which selects one of the two values based on a bit value of the ultrasound message 300 that is currently shifted out of the message register 735 by the shift signal 745. Thus, the bit values of the ultrasound message 300 server as control values for the multiplexer 710 to select one of the two values respectively provided by the circular buffers 700, 705. For example, if the bit output from the message register 735 is a one, the multiplexer 710 selects the value from the circular buffer 705 for the frequency f1. If, however, the value of the bit output from the message register is zero, the multiplexer 710 selects the value from the circular buffer 700 corresponding to the frequency f0. Once selected, the shift signal 745 is not activated for a duration of a single bit transmission. This can be, for example, 20 ms as described above.

With the multiplexer 710 set to select values from one of the two circular buffers 700, 705, the pointer signal is repeatedly activated so that each value within the selected circular buffer 700, 705 is outputted. These outputted values are provided by the multiplexer 710 to the D/A converter 715 where they are converted into analog voltages in order to generate corresponding analog voltages. Because each value of the selected circular buffer is successively provided to the D/A converter 715 by the multiplexer 710, the resulting waveform at the output of the D/A converter is a voltage ramp.

This voltage ramp is provided to a voltage controlled oscillator (VCO) 720, which generates an alternating current (A/C) signal having a frequency according to an input voltage of the VCO 720. Because the voltage ramp is provided as an input to the VCO 720, the resulting output signal has a frequency that varies accordingly, generating the frequency sweep. The output of the VCO 720 is then provided to output circuits, such as an amplifier circuit 725, in order to drive a sound transducer 730 which generated the ultrasound waves corresponding to the frequency sweep of the bit that was outputted from the message register 745. Once the entire sweep is converted into ultrasound waves as described above, the VCO 720 and/or amplifier circuit 720 may be deactivated for a predetermined period of time in order to generate the guard interval 510 or 530 in FIG. 5. Then the shift signal 745 is activated to shift another bit of the ultrasound message 300 into the control input of the multiplexer 710 and the above-described process is repeated.

As can be appreciated the ultrasound unit 230 illustrated in FIG. 7 is merely exemplary and other arrangements of the ultrasound unit 230 are possible. For example, more than one VCO 720 may be used to generate sweeps corresponding to f1 and f0 in parallel, and an analog switch may then be used to select which of the sweeps is provided to the amplifier circuit 725. Alternatively, a series of fixed-frequency oscillators may generate a range of frequencies that are selected based on the bit values of the ultrasound message 300 using discrete circuitry. Additional circuitry to filter the output of the VCO 720 or to shape it by, for example, applying a window function may also be provided. As such, the ultrasound unit 230 illustrated in FIG. 7 in no way limits the present disclosure.

Figure 8:
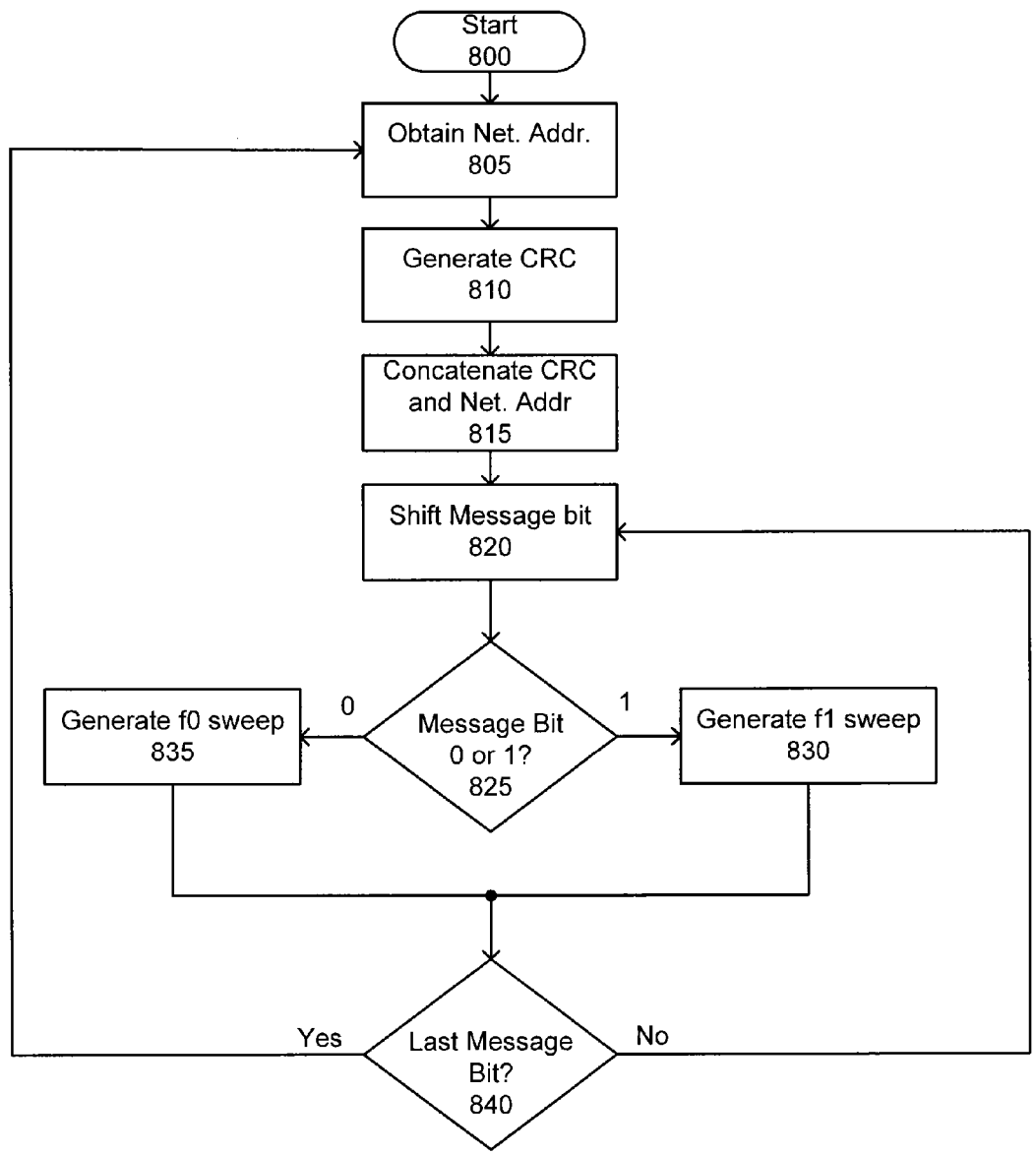
FIG. 8 is a flowchart of ultrasound message transmission according to exemplary aspects of the present disclosure.

Next, the process performed by the telecommunications device 30 in order to transmit the ultrasound message 300 is explained with reference to FIG. 8. The process in FIG. 8 begins at step 800 and proceeds to step 805 where the network address 310 of the telecommunications device 30 is obtained from, for example, the network address area 600 of the memory 205. The network address 310 may also be obtained from an external device, such as a DHCP server or through any other known method. Once the network address 310 is obtained, the process moves to step 810 in which the CRC code 330 is generated based on the network address 310. The CRC code 330 may also be generated based on the network address 310 and optional data 320 in the event that the optional data 320 is to be included in the ultrasound message 300. After the CRC code 330 is generated the process moves to step 815 in which the network address 310, the CRC code 330 and the optional data 320, if any, are concatenated to form the ultrasound message 300. The process then moves to step 820 in which the ultrasound message is loaded into the message register 735 and a first bit is shifted out of the message register 735 as discussed above with reference to FIG. 7.

At step 825, the process determines whether the bit shifted our of the message register 735 is a logic one or a logic zero. If it is a logic one, the process moves to step 830 in which the frequency sweep corresponding to the frequency f1 is generated, and if the bit is a logic zero the process moves to step 835 in which the frequency sweep for the frequency f0 is generated. After either of the two frequency sweeps is generated, the process moves to step 840 in which it is determined whether all bits of the ultrasound message 300 have been shifted out of the message register 735 and therefore transmitted via ultrasound as described above. If so, the process returns to step 805 in order to transmit another instance of the ultrasound message 300. Otherwise, the process returns to step 820 in order to shift another bit out of the message register 735 and generate a corresponding ultrasound frequency sweep until all of the bits of the ultrasound message 300 have been transmitted.

Figure 9:
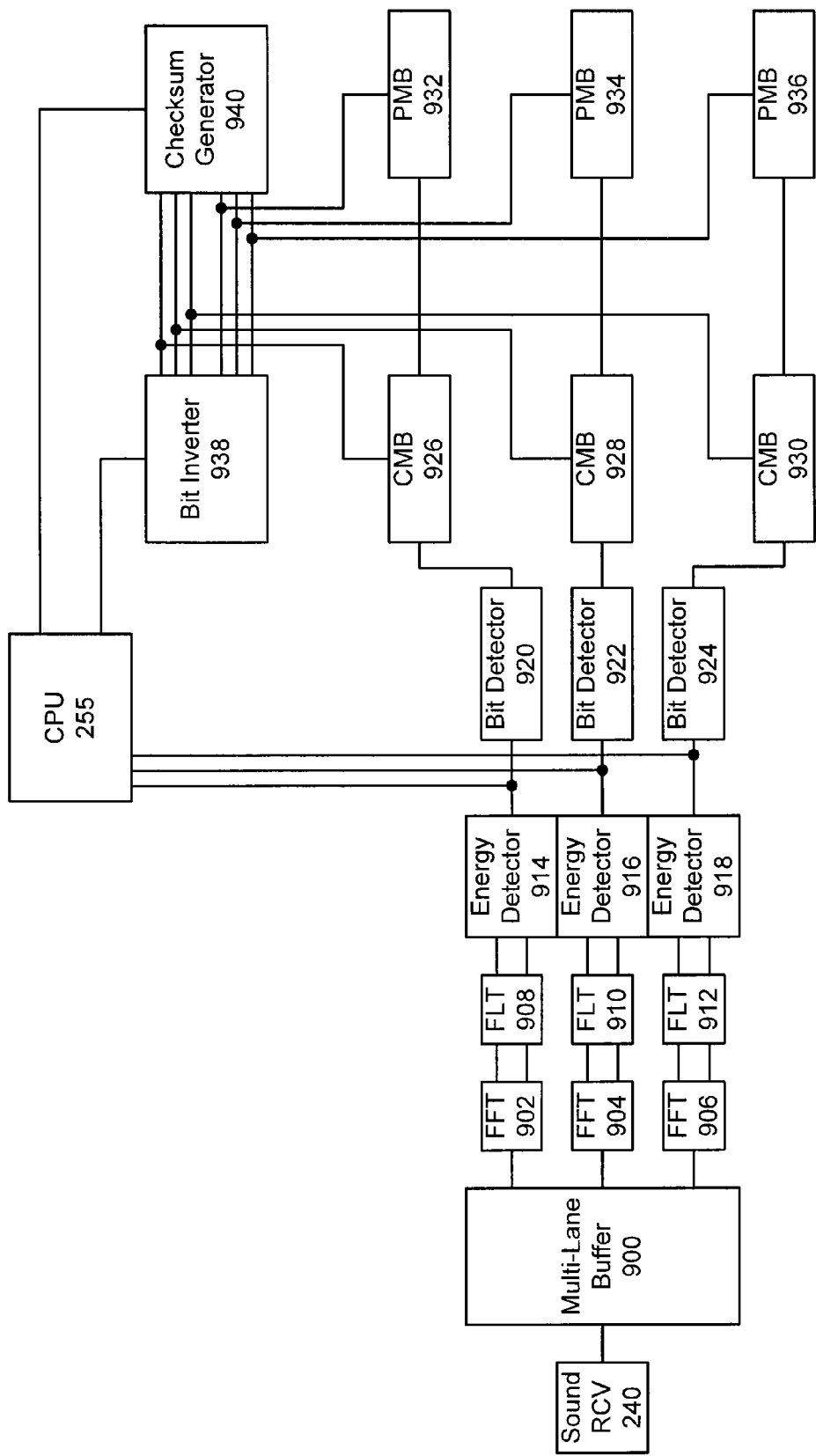
FIG. 9 is a block diagram of a terminal device according to exemplary embodiments of the present disclosure.

FIG. 9 is a functional diagram of a terminal device 280 according to exemplary aspects of the present disclosure. In FIG. 9, the sound receiving unit 240 receives ultrasound waves carrying the bits of the ultrasound message 300 and converts the sound waves into an electric signal. The sound receiving unit 240 may also preprocess the electric signal by, for example, filtering the signal, amplifying the signal and sampling the signal. As such, the sound receiving unit 240 may include circuitry such as analog filters, switched-capacitor filters, digital-to-analog converters, digital filters and the like, as one of ordinary skill would recognize. Further the samples generated by the sound receiving unit 240 may have 8-bit, 16-bit, 32-bit, 64-bit, 128-bit or any other resolution known in the art. As such, the particular structure of the sound receiving unit 240 in no way limits the present disclosure.

The sound receiving unit 240 is connected to a multi-lane buffer 900, which stores the samples outputted by the sound receiving unit 240. The multi-lane buffer 900 has, for example, three parallel lanes each of which is provided with the samples from the sound receiving unit 240. The lanes in the multi-lane buffer 900 are offset with respect to each other as explained below in detail. Each lane of the multi-lane buffer is connected to a corresponding Fast Fourier Transform (FFT) circuit 902, 904, 906 which computes the energy content of the received bits for the frequencies f1 and f0. The outputs of each FFT circuit 902, 904, 906 are connected to a corresponding median filter 908, 910, 912 in order to filter possible noise components from, for example, fan noise, charger noise, or any other mechanical or electrical equipment noise that may affect the analysis performed by the terminal device 280.

FIG. 9 illustrates the filters 908, 910 and 912 as always being applied to the outputs of the FFT circuits 902, 904, 906. However, the filters 908, 910 and 912 may also be conditionally applied when, for example, a peak energy of a particular frequency component exceeds an average energy of a given band (the f1 sweep or the f0 sweep) by a predetermined value. As such, the method of filtering the FFT circuit 902, 904 and 906 outputs illustrated in FIG. 9 is merely exemplary and other methods are possible without departing from the scope of the present disclosure.

Each filter 908, 910, 912 is connected to an energy detector 914, 916, 198 which detects an overall energy value for each lane. This energy value may be determined by summing the energies of both f1 and f0 for each lane, averaging the energy values of both frequencies f1 and f0, or by any other known method. This energy value provides an indication as to which lane may include a valid ultrasound message 300 as will be described below.

The output of the energy detectors 914, 916, 918 may be provided to both a corresponding bit detector 920, 922, 924 and the CPU 255. The bit detectors 920, 922, 924 may use the two energy values corresponding to the two frequencies f1 and f0 to determine whether a received bit is a one or a zero. For example, the bit detector may compare the energy surrounding the frequency f1 and the energy surrounding the frequency f0 to determine whether a bit value of one is received (when f1 has a higher energy) or whether a bit value of zero is received (when f0 has a higher energy.) Further, the bit detectors 920, 922, 924 may apply a threshold to the energy values corresponding to both f1 and f0 in order to reduce the possibility of a false detection due to noise.

The bits detected by the bit detectors 920, 922, 924 are respectively shifted into the current message buffers (CMB) 926, 928, 930. Each bit already stored in the CMBs 926, 928, 930 are also shifted by one position and the overflow bit, if any, is shifted into the first position of a corresponding previous message buffer (PMB) 932, 934, 936. The bits of the PMBs are also shifted by one and any overflow bits are discarded.

A checksum generator 940 generates a checksum for each CMB 926, 928, 930 and each PMB 932, 934, 936 of each lane. The checksum generator 940 then provides the checksums to, for example, the CPU 255 to be compared with the CRC code 330. The checksum generator 940 also repeats this process using a different bit in each CMB 926, 928, 930 and each PMB 932, 934, 936 in an attempt to match the CRC code 330. In FIG. 9, the checksum generator 940 is connected to each CMB 926, 928, 930 and each PMB 932, 934, 936 in such a way that the bits of each of these buffers may be read out in parallel. However, the checksum generator 940 may also be connected so as to read each bit of the CMBs 926, 928, 930 and PMBs 932, 934, 936 serially, as can be appreciated.

A bit inverter 938 is also connected to the CMBs 926, 928, 930 and PMBs 932, 934, 936, as well as to the CPU 255. If no checksum matching the CRC code 330 is identified, the bit inverter 938 may compare bits of a CMB 926 to corresponding bits in a PMB 932 to determine whether all bits match therebetween. If there is a bit that does not match, the bit inverter 938 inverts the bits that do not match and corresponding checksums are generated by the checksum generator 940. This process is repeated for the CMBs 928, 930 and PMBs 934, 936 of the other two lanes. Of course, checksums for all CMBs 926, 928, 930 and all PMBs 932, 934, 936 of all lanes may be calculated in parallel, and the bit inverter 938 may compare and invert bits in all CMBs 926, 928, 930 and all PMBs 932, 934, 936 of all lanes simultaneously. Alternatively, checksum calculations and bit inversions may be carried out sequentially, but the order in which these operations are performed by the checksum generator 940 and the bit inverter 938 in no way limit the present disclosure.

Once a checksum matches the CRC 330, the CPU 255 uses the checksum together with the energy values for each lane calculated by the energy detectors 914, 916, 918 to identify one of the CMBs 926, 928, 930 and all PMBs 932, 934, 936 as including a valid ultrasound message 300 from which the network address 310 and optional data 320, if any, may be extracted and used to communicate with the telecommunications device 30 via the communications network.

Figure 10:
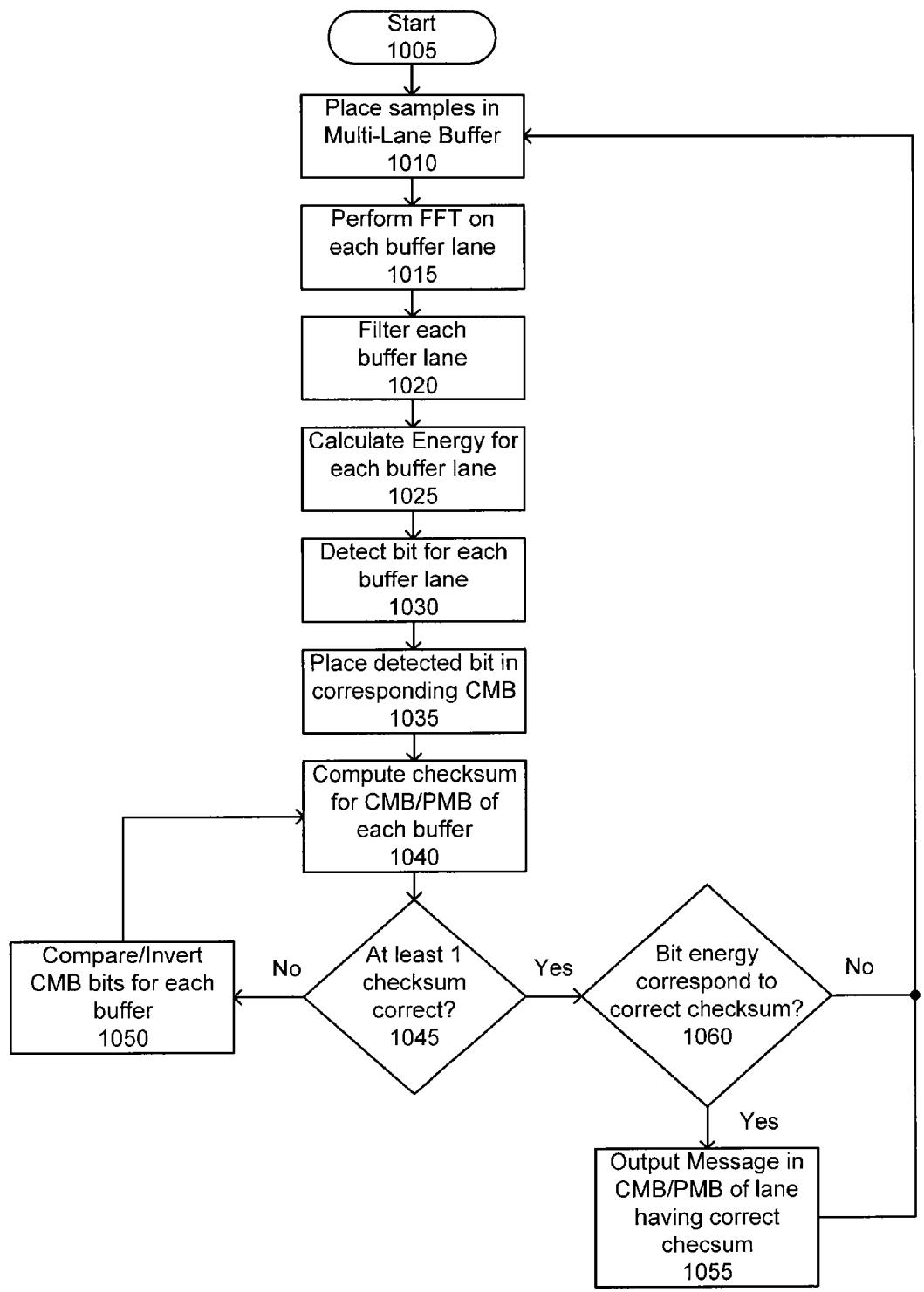
FIG. 10 is a flowchart of an ultrasound message reception process of the terminal device according to exemplary embodiments of the present disclosure.

FIG. 10 is a flowchart of an exemplary process carried out by the terminal device 280 in FIG. 9. In FIG. 10, the process starts at step 1005 and proceeds to step 1010 where the samples outputted by the sound receiving unit 240 are placed in each lane of the multi-lane buffer 900. Then in step 1015 an FFT is performed on each lane and the results of the FFTs are filtered for each lane at step 1020. At step 1025 the energy for each lane is calculated by summing the energies for all frequency components, averaging the energy for all frequency components or by any other method as described above. At step 1030 bit values are detected for each lane by, for example, comparing the energy levels of f0 and f1 and selecting the highest of the two. As noted above, the energy levels of f0 and f1 may be thresholded prior the comparison to reduce the likelihood of an incorrect bit identification due to noise.

In step 1035 of FIG. 10, the detected bits are placed in corresponding current message buffers of each lane and each bit in each of the current message buffers are shifted. As noted above, any overflow bits are shifted into the previous message buffers of the lanes and bits overflowing from the previous message buffers are discarded. At step 1040, checksums are calculated as discussed above, and at step 1045 the CPU 255 determines whether at least one of the checksums is correct. If at least one checksum is correct the energy level of a corresponding lane s checked at step 1060 to determine whether it is the highest energy level of all of the lanes. If it is, the method proceeds to step 1055 where the corresponding ultrasound message 300 is outputted so that the network address 310 included therein can be used to communicate with the telecommunications device 30. If at step 1060, the energy level of the lane is not the highest the process reverts to step 1010 to start again. This is because if the energy level is not the highest the correct checksum may be a result of bit error or noise influence.

Returning to step 1045, if no checksum is identified as correct, the process moves to step 1050 where the bits of the previous message buffer are compared to those of the current message buffer for all lanes, and miss-matched bits are inverted. Then the process moves to step 1040 to recomputed the checksums and to step 1045 to determine whether at least one of the recomputed checksums is correct. This process repeats until a correct checksum is identified.

Figure 11:
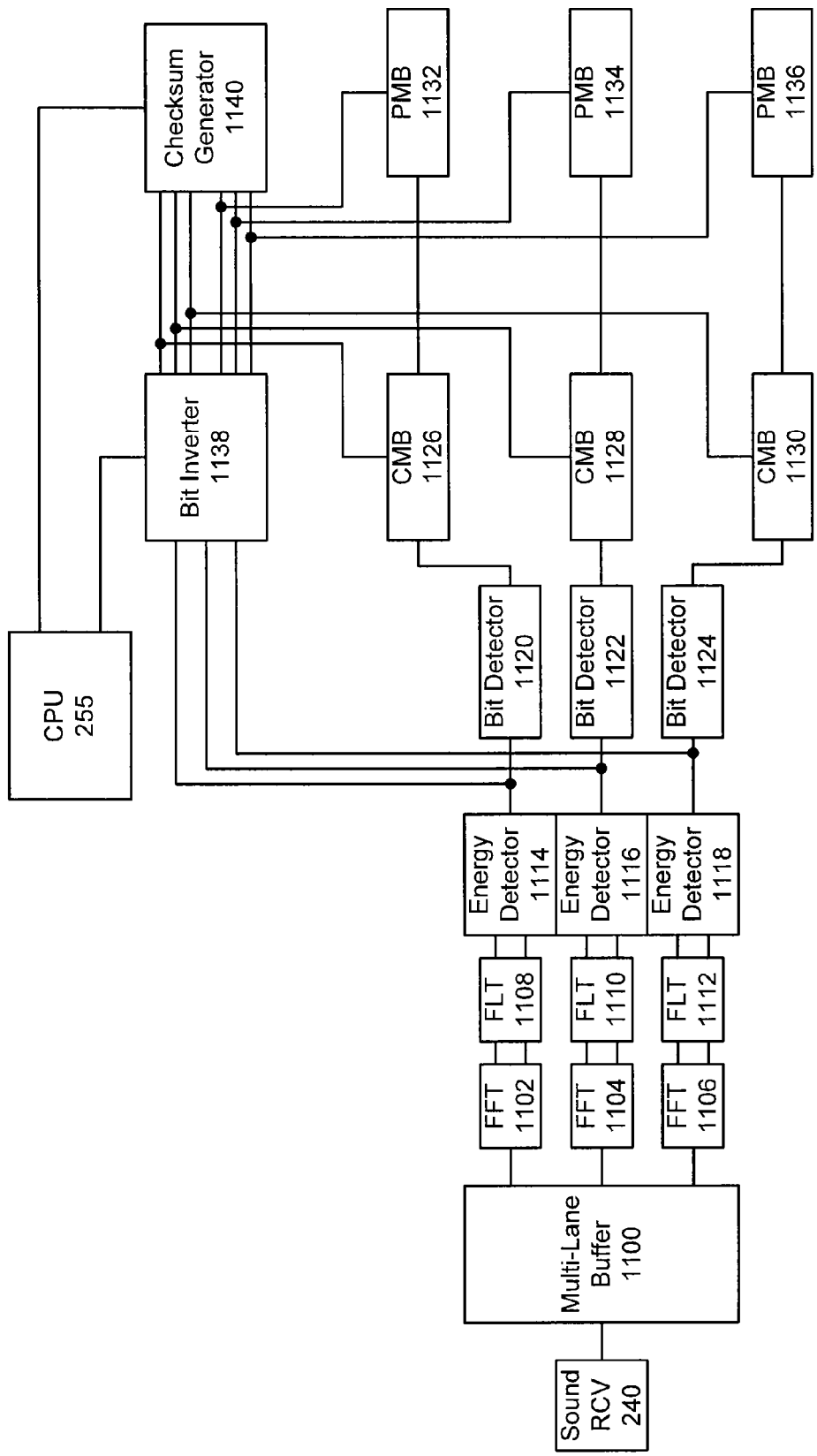
FIG. 11 is a block diagram of another terminal device according to exemplary embodiments of the present disclosure.

Next, FIG. 11 is a block diagram of another example of the terminal device 280 according to aspects of the present disclosure. In FIG. 11, the sound receiving unit 240; multi-lane buffer 1100; FFT units 1102, 1104, 1106; filters 1108, 1110, 1112; energy detectors 1114, 1116, 1118; bit detectors 1120, 1122, 1124; CMBs 1126, 1128, 1130; PMBs 1132, 1134, 1136; CPU 255; and checksum generator 1140 have substantially the same functionality as the corresponding circuits described above with reference to FIG. 9. Therefore, further description of these circuits is omitted for the sake of brevity.

The bit inverter 1138 of FIG. 11 is connected to each of the CMBs 1126, 1128, 1130 and the PMBs 1132, 1134, 1136 of the lanes, and is also connected to the outputs of the energy detectors 1114, 1116, 1118. The output of the energy detectors 1114, 1116, 1118 are not connected to the CPU 225 as is the case in FIG. 9. Because the bit inverter 1138 has access to energy values for each bit, if the checksums generated by the checksum generator 1140 do not match the CRC code 330, the bit inverter 1138 inverts bits have low energy values in an attempt to correct any bit errors. As can be appreciated, the bit inverter 1138 may determine which bits have low energy in a number of ways without departing from the scope of the present disclosure. For example, the bit inverter may select a single bit having a lowest energy value or may compare each bit to a threshold and invert those bits that fall below the threshold. In addition, the bit inverter may invert only one bit between each checksum computation or may invert several bits. The bit inverter 1138 may also operate on one lane at a time or on multiple buffers and multiple lanes simultaneously. As such, the implementation of the bit inverter 1138 is not limiting upon the present disclosure.

Figure 12:
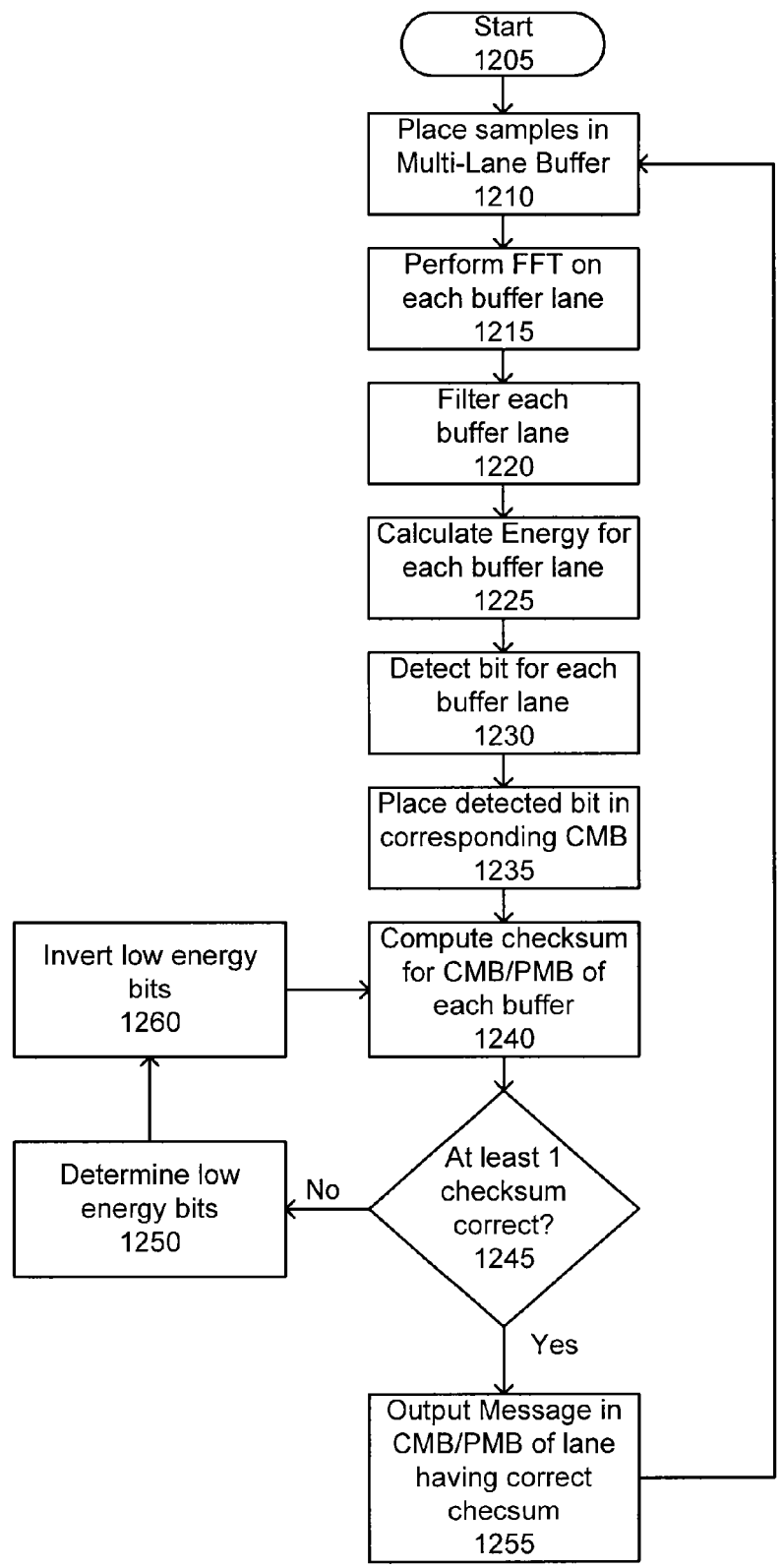
FIG. 12 is a flowchart of an ultrasound message reception process performed by the other terminal device according to exemplary aspects of the present disclosure.

FIG. 12 is a flow chart of an example process performed by the terminal device 280 of FIG. 11. In FIG. 12 the process begins at step 1205 and proceeds to step 1210 where each lane of the multi-lane buffer 1100 is loaded with a sample from the sound receiving unit 240. Then at step 1220 FFTs are preformed on each lane of the multi-lane buffer, and the results of the FFTs are filtered at step 1220. At step 1225, energy values for each lane are calculated as described above with respect to FIG. 10. Then at step 1230 bit values are determined and the bit values are placed in corresponding CMBs at step 1235 as described with respect to FIG. 10 above. At step 1240 a checksum for each CMB 1126, 1128, 1130 and each PMB 1132, 1134, 1138 is calculated and a correct checksum is identified at step 1245. If a correct checksum is identified at step 1245, the ultrasound message 300 of a corresponding CMB 1126, 1128, 1130 or PMB 1132, 1134, 1138 is outputted as the valid ultrasound message 300, and then the process returns to step 1210 to perform another iteration.

If no correct checksum can be identified at step 1245, the process moves to step 1250 where bits having low energy values are identified as discussed above with respect to FIG. 11. The low energy bits are then inverted at step 1260 and the process re-computes the checksums at step 1240 and determines whether any of the recomputed checksums is correct at step 1245. This loop is repeated until a correct checksum is identified as described above.

Figure 13:
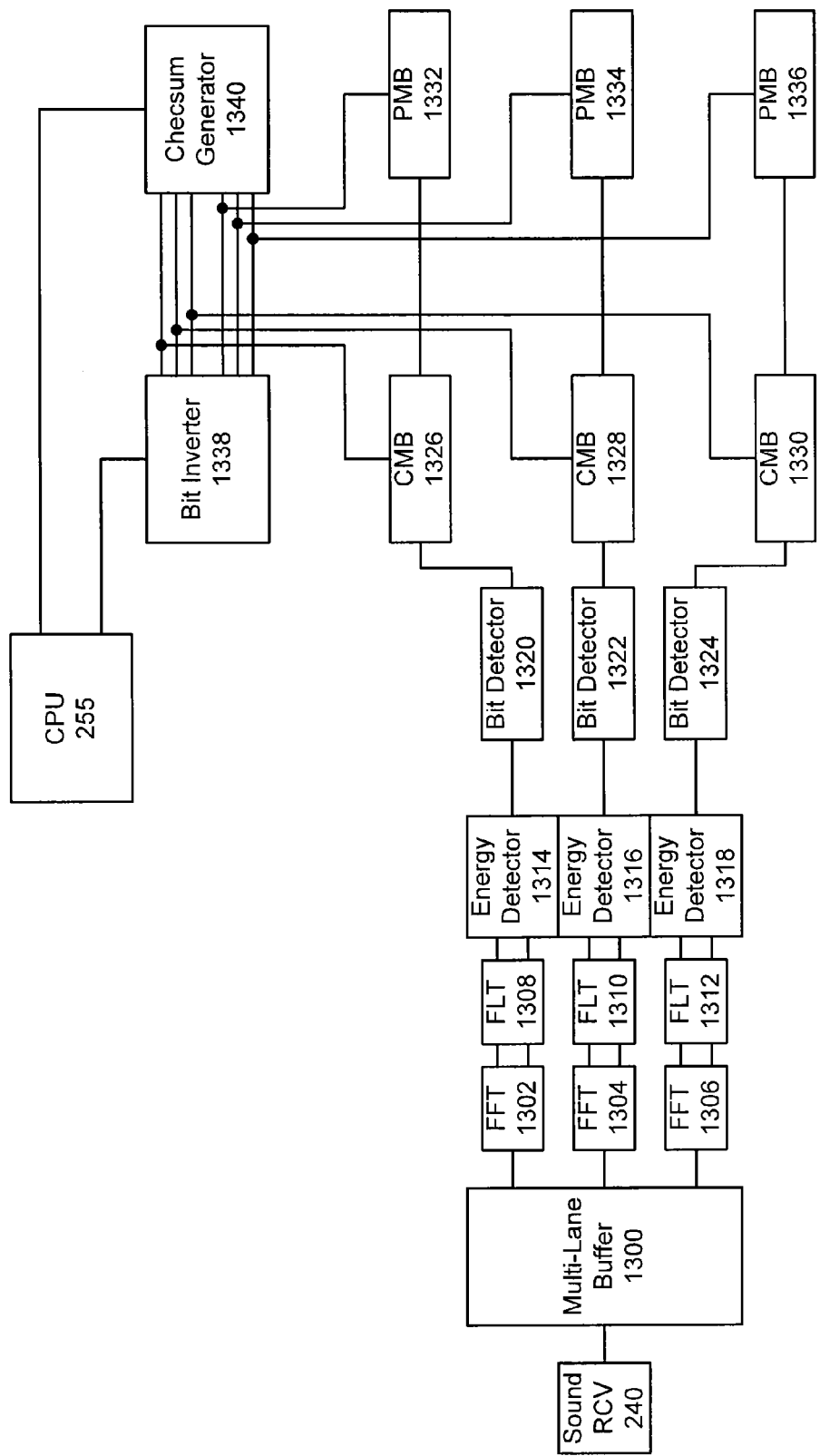
FIG. 13 is a block diagram of a further terminal device according to exemplary aspects of the present disclosure.

FIG. 13 is a block diagram of a further example of the terminal device 280 according to aspect of the present disclosure. In FIG. 13, the sound receiving unit 240; multi-lane buffer 1300; FFT units 1302, 1304, 1306; filters 1308, 1310, 1312; energy detectors 1314, 1316, 1318; bit detectors 1320, 1322, 1324; CMBs 1326, 1328, 1330; PMBs 1332, 1334, 1336; CPU 255; and checksum generator 1340 have substantially the same functionality as the corresponding circuits described above with reference to FIG. 9. Therefore, further description of these circuits is omitted for the sake of brevity.

In FIG. 13, the outputs of the energy detectors 1314, 1316, 1318 are not connected to the CPU 255 as in FIG. 9 or to the bit inverter 1338 as in FIG. 11. Thus, the exemplary terminal device 280 of FIG. 13 does not use the energy level of each lane to determine whether a checksum corresponds to a valid ultrasound message 300 (as in FIG. 9) or to determine which bits have low energy values and should be inverted (as in FIG. 11.) Instead, the CRC code 330 and checksum generated by the checksum generator 1340 are at least 32-bit in length. Because the CRC code length is 32-bit, matching a checksum generated by the checksum generator 1340 to the CRC code 330 is sufficiently robust to eliminate the need for an alternate process to corroborate the validity of an ultrasound message 300, such as by use of the lane energies as described above.

Figure 14:
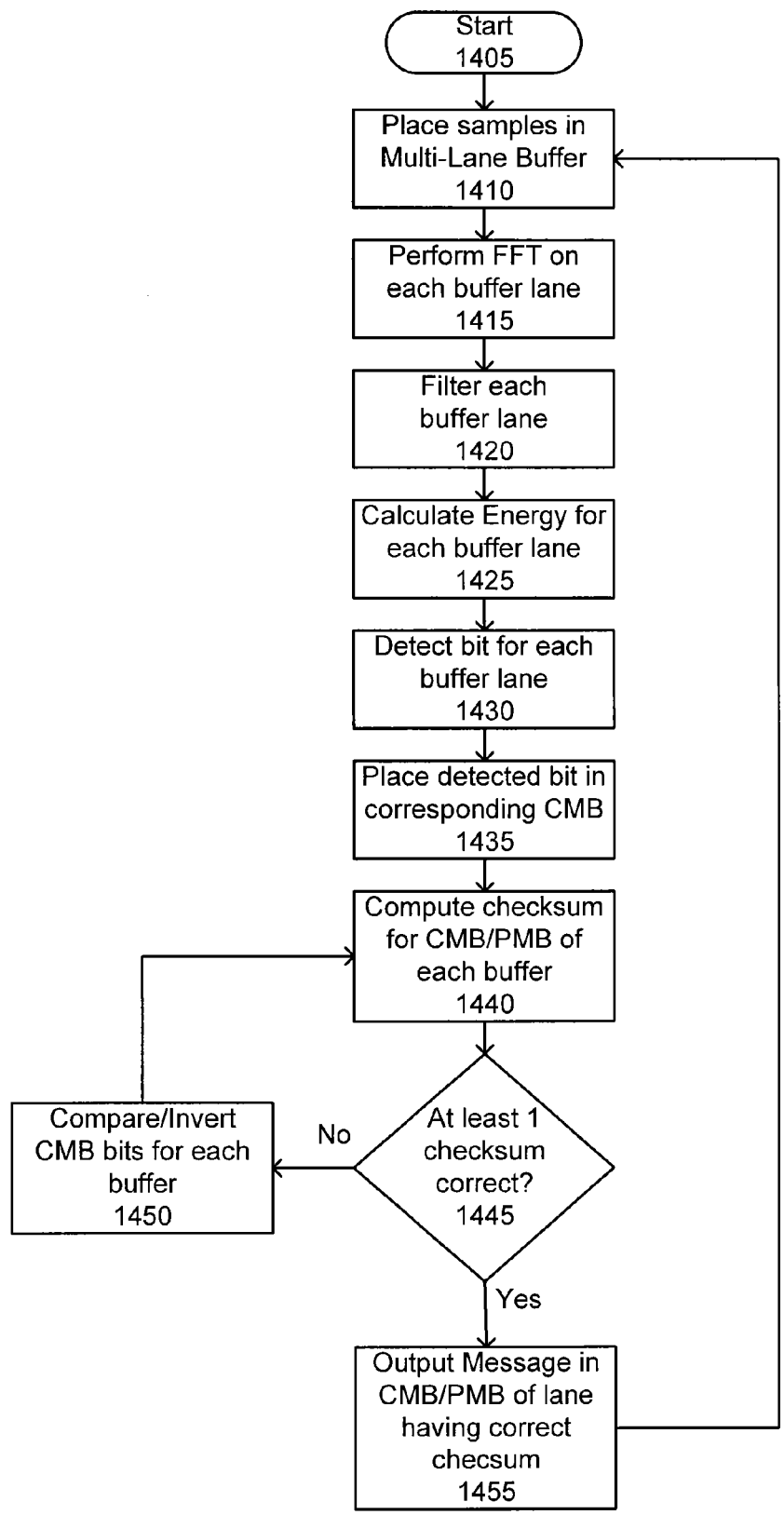
FIG. 14 is a flowchart of an ultrasound message reception process performed by the further terminal device according to exemplary aspects of the present disclosure.

FIG. 14 is a flow chart of an exemplary process executed by the terminal device 280 of FIG. 13. In FIG. 14, the process begins at step 1405 and the samples from the sound receiving unit 240 are placed in the multi-lane buffer 1300 at step 1410. At step 1415, FFTs are preformed on each lane and the results of the FFTs are filtered at step 1420. Then energy values are calculated for each lane at step 1425 and provided to the bit detectors 1320, 1322, 1324 for bit detection at step 1430. At step 1435, the detected bits are placed in the corresponding CMBs 1326, 1328, 1330 and checksums for each CMB 1326, 1328, 1330 and each PMB 1332, 1334, 1336 are calculated at step 1440. Whether at least one checksum is correct is determined at step 1445. If at least one checksum is correct, the ultrasound message 300 in a corresponding CMB 1326, 1328, 1330 or PMB 1332, 1334, 1336 is output as a valid ultrasound message. The process then reverts to step 1410.

If it is determined at step 1445 that no checksum is correct, the process moves to step 1450 where the bit inverter compares bits between the CMB 1326, 1328, 1330 and PMB 1332, 1334, 1336 of each lane and inverts any miss-matched bits. The process then moves to step 1440 where the checksums are re-computed and then to step 1445 in order to determine whether any of the recomputed checksums are correct. This is repeated until a correct checksum is identified and a corresponding ultrasound message 300 is outputted so that the network address 310 included therein can be extracted and used to communicate with the telecommunications device 30.

Next operation of an exemplary multi-lane buffer is described with respect to FIG. 15. Because transmission and reception of the ultrasound messages 300 is essentially incoherent and phase-blind, a situation may arise in which sampling by the sound receiving unit 240 may not be aligned with the reception of bits 500, 520, for example. To account for this the multi-lane buffer, which may be any of multi-lane buffers 900, 1100, 1300, in FIG. 15 includes three lanes A, B, C, each offset in time with respect to the others. For example, in FIG. 15 each lane includes eight storage cells, and adjacent lanes are offset with respect to each other by one-fourth of their length or two cells. As one of ordinary skill would recognize, each lane A, B, C may include more or fewer cells and each cell may have a width sufficient to accommodate the resolution of the sound receiving unit 240. For example, if the sound receiving unit 240 outputs 32-bit samples, then each cell in lanes A, B, C are of 32-bit widths. Also, the multi-lane buffer 900, 1100, 1300 may include more than three lanes or less than three lanes without departing from the scope of the present disclosure.

Because the lanes A, B, C are offset with respect to each other, a stream of bits and guard intervals received are aligned differently with each lane. For example, in lane A samples corresponding to bit data, labeled B, are stored in the first four cells 1505-1520 and guard interval bits G are stored in the last four cells 1525-1540. Since lane B is shifted by two cells with respect to lane A, cells 1545 and 1550 include bit samples, cells 1555-1570 include guard interval samples and cells 1575-1580 include bit samples from a previous bit. Lastly, lane C includes guard samples in its first four cells 1585-1600 and bit samples from a previous bit in its last four cells 1605-1620. Thus, lane A includes all adjacent samples of a received bit and all adjacent samples of the immediately preceding guard interval, lane B includes the first two samples of the received bit, all adjacent samples of the immediately preceding guard interval and two samples of the previously received bit, and lane C include all adjacent samples of the guard interval, all adjacent samples of the previously received bit but no samples of the received bit.

To determine which lane A, B, C is best aligned with the reception timing of the bits, energy calculations may be performed on a subset of the cells of each lane. For example, the first four cells of each lane may be used to determine the energy for each cell. In this case, lane A would have a maximum energy because it is the only lane with bit samples in all of its first four cells 1505-1520. If the last four cells are used to determine energy, then lane C would yield the highest energy because it is the only lane with bit samples in all of its last four cells. Other techniques are also possible, such as selecting the middle cells, selecting cells that are not adjacent to each other, and the like. As such, the cells of a lane selected to carry out the energy calculation in no way limits the present disclosure.

In the description of FIG. 15, the bit samples may correspond to either a bit transmitted via a sweep surrounding f1 or a bit transmitted as a sweep surrounding f0. In either case bit samples have a higher value than guard interval samples because nothing is transmitted during the guard interval. However, one of ordinary skill in the art would recognize that the bit samples may be of any value without departing from the scope of the present disclosure.

Next, an alternative ultrasound unit 230 according to other exemplary aspects of the present disclosure is described with reference to FIG. 16. The ultrasound unit 230 in FIG. 16 transmits 3-bit symbols. Each bit in the symbol corresponds to a different frequency sweep centered on one of three frequencies f0, f1, f2. The frequency sweeps are generated as described above with reference to FIG. 5 and are not described again for the sake of brevity. If a bit has a value of one, the corresponding frequency sweep is transmitted, and if the bit has a value of zero, the corresponding frequency sweep is not sent. As such, the value of a bit that forms the symbol is determined based on a present or absence of a corresponding frequency sweep. Of course, one of ordinary skill would recognize that this may be reversed so that the presence of a frequency sweep corresponds to a bit value of one and the absence of a frequency sweep corresponds to a value of zero.

Figure 16:
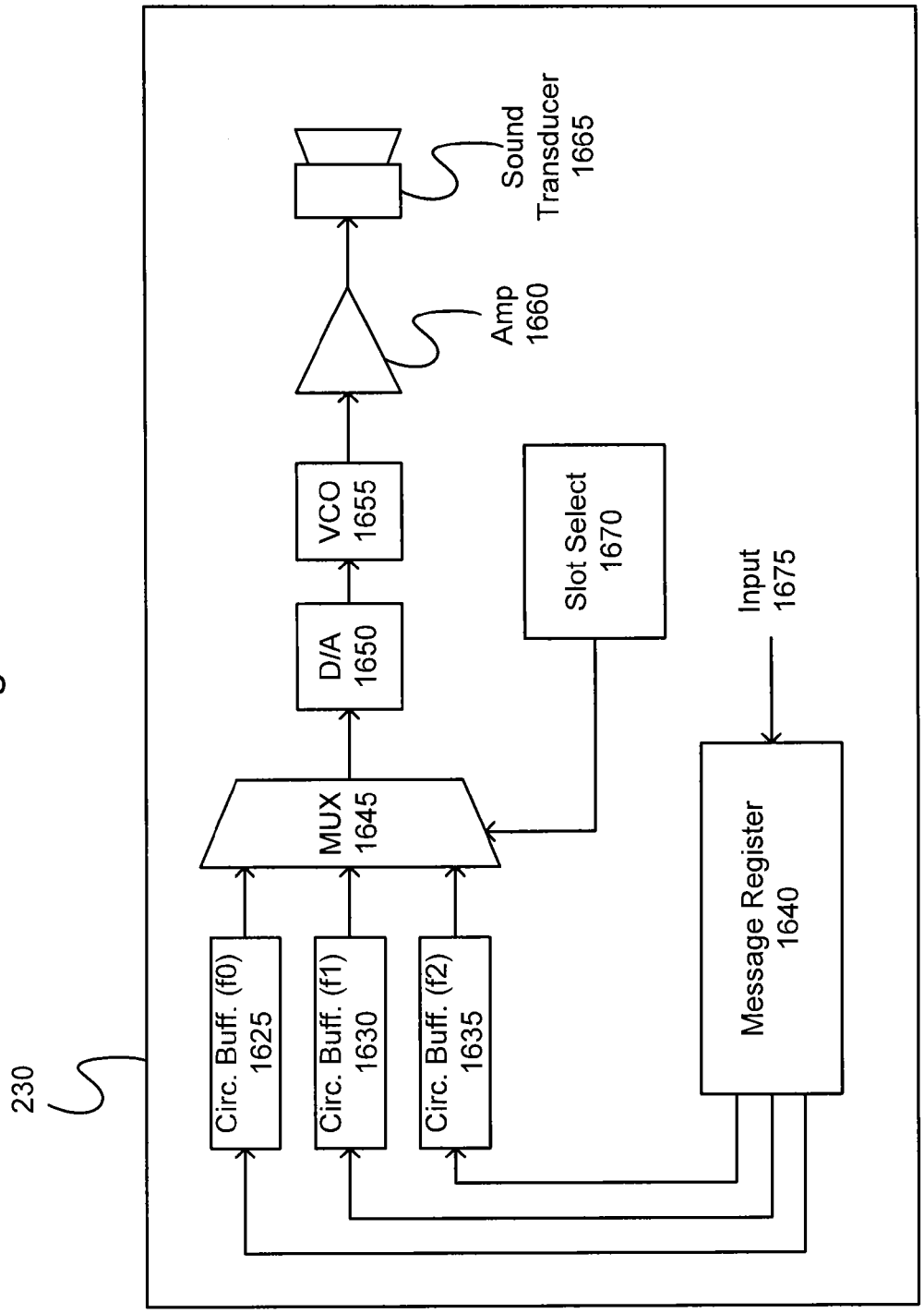
FIG. 16 is a block diagram of an ultrasound unit according to another exemplary aspect of the present disclosure.

In FIG. 16, the symbols are loaded via the input 1675 of the message register 1640. The message register 1640 is at least one symbol in length and three bits in width so that it may store at least one symbol. The message register 1640 may also be longer in order to store multiple symbols and may be wider or narrower than three bits. For example, the message register 1640 may be only one bit wide so that each bit of a symbol is input and output serial according to a predetermined order. However, in FIG. 16 the message register 16 is shown as being 3 bits wide for simplicity.

The outputs of the message register 1640 are respectively connected to the enable pin of one of three circular buffers 1625, 1630 and 1630. Each circular buffer includes sample values that, when provided to the digital-to-analog converter 1650 cause the digital-to-analog converter 1650 to generate a voltage ramp, which in turn drives a voltage-controlled oscillator 1655 to generate a corresponding frequency sweep as described in detail below.

The sample values in each circular buffer 1625, 1630, 1635 correspond to a frequency sweep about one of the frequencies f0, f1, f2. For example circular buffer 1625 includes samples to generate a frequency sweep centered on f0, circular buffer 1630 includes samples to generate a frequency sweep centered on f1, and circular buffer 1635 includes samples to generate a frequency sweep centered on f2. A corresponding one of the outputs of the message register 1640 is connected to the enable pin of each of the circular buffers 1625, 1630, 1635 so that its symbol bit can activate, in the case of a value of one for example, or deactivate, in the case of a value of zero, a corresponding circular buffer 1625, 1630, 1635. Each buffer is also connected to a shift signal (not shown) in order to sequentially output its sample values to the multiplexer 1645. Of course, if a circular buffer 1625, 1630, 1635 is deactivated because of the bit value applied to its enable pin, that circular buffer does not output sample values so that a corresponding frequency sweep is not sent.

The multiplexer 1645 provides the samples from one of the three circular buffers 1625, 1630, 1635 to the digital-to-analog converter 1650 under control of a time slot selector 1670. The time slot selector 1650 selects a time slot corresponding to each frequency f0, f1, f2. For example, f0 may be sent in the first time slot beginning at 0 ms, f1 may be sent at 10 ms and f2 may be sent at 20 ms. In others words the time slots for each frequency sweep are set 10 ms apart. Thus, if each frequency sweeps has a duration of 6 ms, the f0 sweep would be from 0 ms to 6 ms, the f1 sweep would be from 10 ms to 16 ms, the f2 sweep would be from 20 to 26 ms, f0 would be from 30 to 36 ms, and so on. The slot selector 1670 causes the multiplexer 1645 to cycle through selection of each of the circular buffers 1635, 1630, 1635 at 10 ms intervals in order to generate the a continuous stream of symbols represented by frequency sweeps for f0, f1 and f2.

For a given time slot the multiplexer 1645 provides the sample values of one of the circular buffers 1625, 1630, 1635 to the digital-to-analog converter 1650. As can be appreciated, the resolution of the digital-to-analog converter and the number of bits per sample may be varied without limitation. The digital-to-analog converter 1655 then generates a voltage level for each sample, which results in a voltage ramp. This voltage ramp is input to a voltage controlled oscillator 1655 which generates a signal whose frequency is determined by an input voltage thereto. Since the input voltage to the voltage controlled oscillator is a voltage ramp, the resulting output signal has a frequency that changes according to the voltage ramp, generating a frequency sweep. The frequency sweep is then provided to an amplifier 1660 which drives the sound transducer 1665 accordingly.

In the above description, the ultrasound unit 230 transmits each frequency sweep for f0, f1, f2 in separate time slots with a time interval therebetween. However, the frequency sweeps for f0, f1, f2 may also be transmitted simultaneously, in overlapping time slots or in adjacent time slots. Further, the order in which the frequency sweeps for f0, f1, f2 are transmitted may be varied without departing from the scope of the present disclosure.

The structure of the ultrasound unit 230 may also be modified without limitation. For example, each circular buffer 1625, 1630, 1635 may be connected to a separate digital-to-analog converter, amplifier and transducer to form separate signal paths for each of the frequency sweeps for f0, f1, f2. Alternatively, separate digital-to-analog converters may be used in conjunction with a single voltage controlled oscillator and transducer with the aid of an analog multiplexer to control provision of the voltage ramps to the voltage controlled oscillator. Further, more than just three frequencies may be used in order to generate the symbols. As such, FIG. 16 is merely exemplary and in no way limits the present disclosure.

Figure 17:
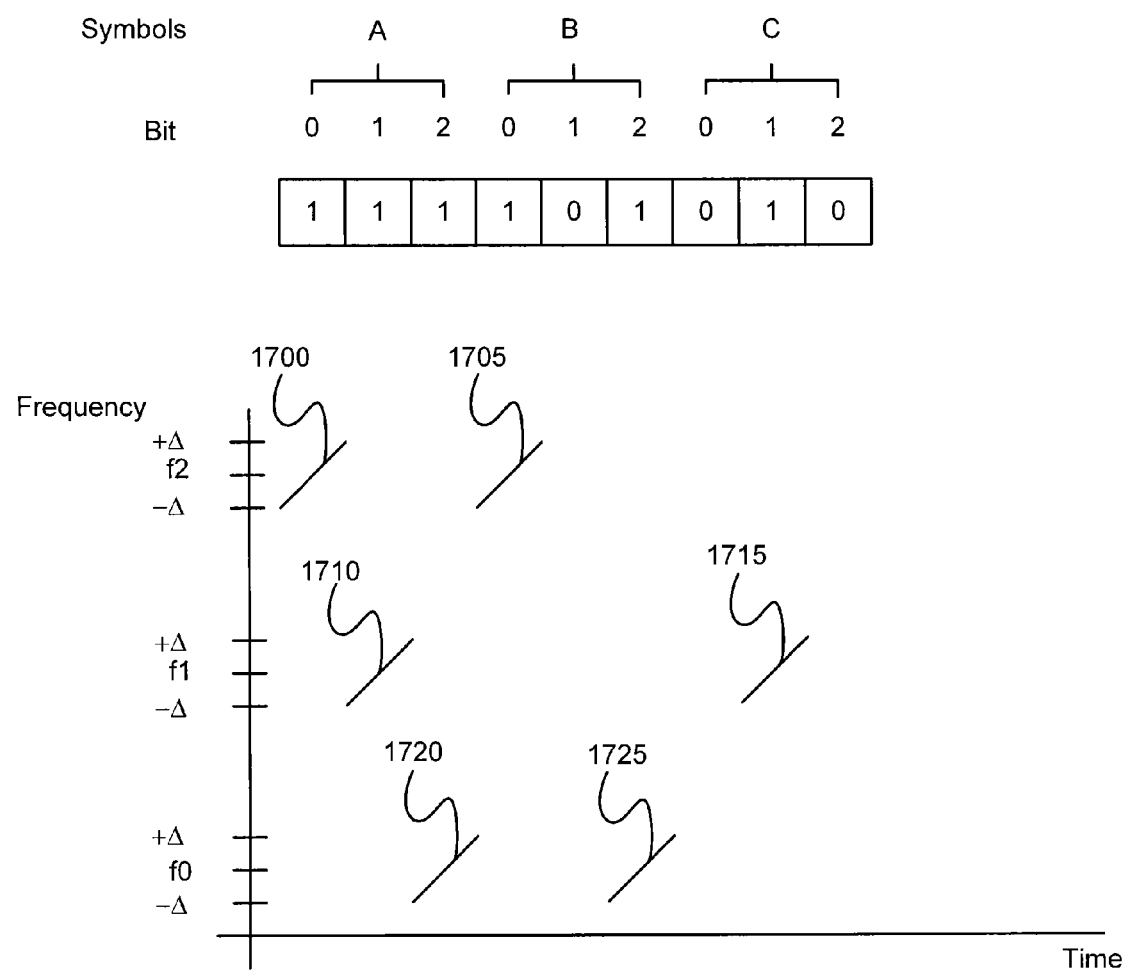
FIG. 17 is a diagram relating symbol information to transmitted ultrasound frequencies according to exemplary aspects of the present disclosure.

FIG. 17 is a diagram of ultrasonic symbol communication according to exemplary aspects of the present disclosure. In FIG. 17, three symbols A, B, C are transmitted back-to-back without pause so that their bits form a continuous stream. In this case transmission of three three-bit symbols is shown for simplicity. However, the transmission of symbols proceeds continuously such that many hundreds or thousands of symbols may be transmitted. As can be appreciated the number of bits per symbol may be varied without limiting the present disclosure.

Each three-bit symbol in FIG. 17 is transmitted as a series of frequency sweeps, one per bit. The presence of a sweep of a given frequency indicates that the corresponding bit has a value of one and an absence of the sweep indicates that a corresponding bit has a value of zero. For example, symbol A of FIG. 17 is the binary equivalent of the number 7 (111). To transmit symbol A, the telecommunications device 30 sends an f2 sweep 1700 for bit 0, an f1 sweep 1710 for bit 1 and an f0 sweep for bit 2. Of course, the telecommunications device may also send the f2 sweep 1720 for bit 2, the f1 sweep for bit 1 and the f0 sweep for bit 0 without departing from the scope of the present disclosure. Because all bits in symbol A have a value of one, all three frequency sweeps are transmitted. In the case of symbol B, bits 0 and 2 have a value of one but bit 1 has a value of zero. Therefore, the telecommunications device 30 sends an f2 sweep 1705 for bit 0 of symbol B and an f0 sweep 1725 for bit 2 of symbol B, but no sweep for bit 1 because this bit is a zero value. In the case of symbol C only one bit, bit 1, has a value of one. Therefore, the telecommunications device 30 sends only one sweep, the f1 sweep 1715.

In FIG. 17, the frequency sweeps 1700, 1705, 1710, 1715, 1720, 1725 do not overlap in time. However, the frequency seeps 1700, 1705, 1710, 1715, 1720, 1725 may overlap one another in time without departing from the scope of the present disclosure. For example, if the duration of each sweep is increased from 6 ms to 12 ms, an overlap of 2 ms between sweeps would result if the sweeps are transmitted at 10 ms intervals (i.e. f2 sweep 1700 may span from 0 ms to 12 ms, f1 sweep 1710 may span from 10 ms to 22 ms, and so on.) As such, FIG. 17 is merely exemplary.

Figure 18:
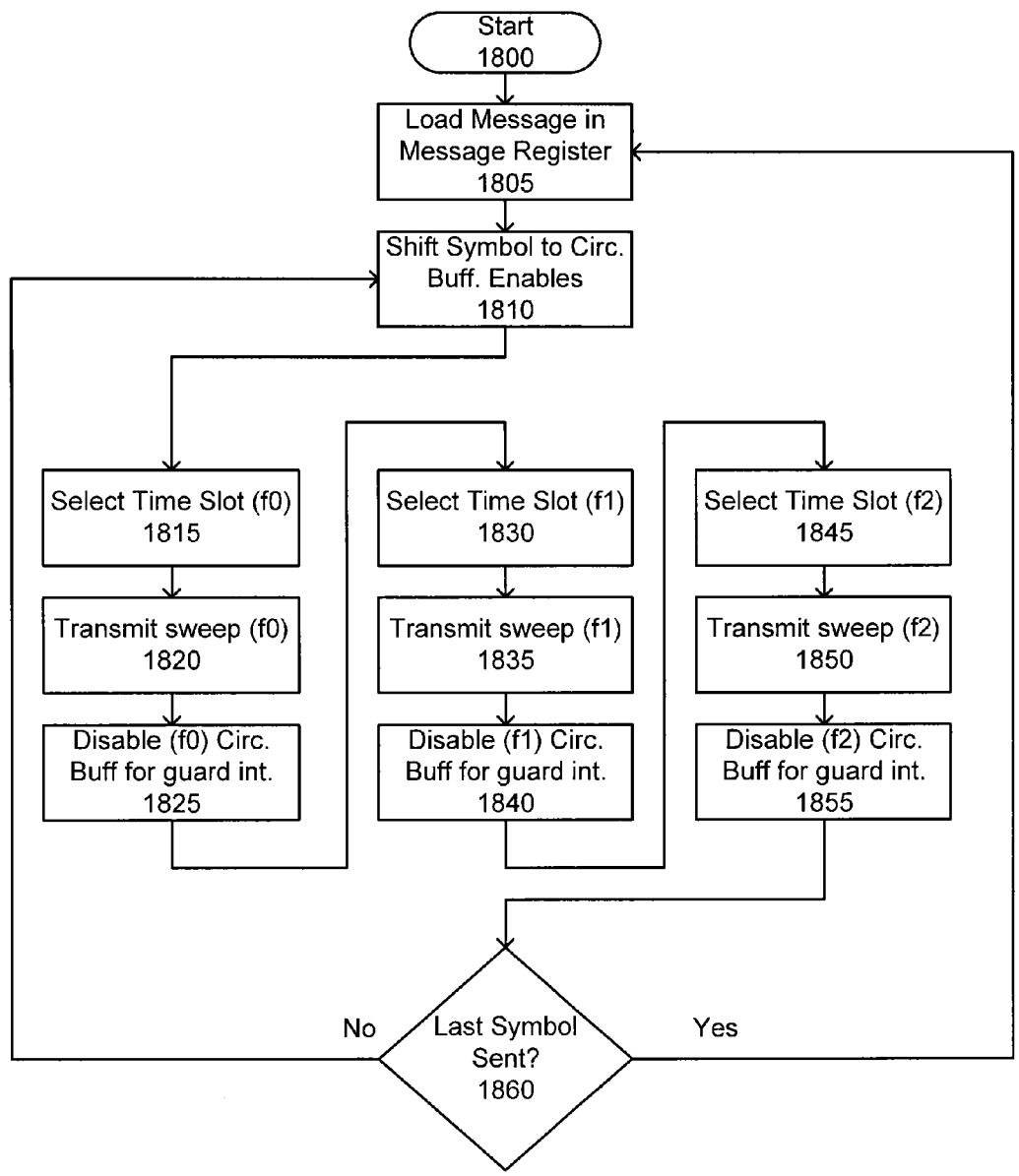
FIG. 18 is a flowchart of an ultrasound message transmission process according to other exemplary aspects of the present disclosure.

FIG. 18 is a flow chart of an ultrasound message transmission process according to exemplary aspects of the present disclosure. The process begins at step 1800 and proceeds to step 1805 where symbols for one message are loaded into the message register 1640. Then at step 1810 the symbol bits are shifted to the enable pins of the circular buffers 1625, 1630, 1635. At step 1815 the time slot selector 1670 selects the first time slot, and step 1820 a sweep for frequency f0 is transmitted. At step 1825 the circular buffer 1625 is disabled for a predefined interval to introduce a guard interval. Then at step 1830 the time slot selector 1670 selects the next time slot, at step 1835 the sweep for frequency f1 is transmitted and at step 1840 the circular buffer 1630 is disabled to introduce a guard interval for the f1 frequency. A similar process is carried out at steps 1845, 1850 and 1855 for the frequency f2, and at step 1860 it is determined whether all symbols have been transmitted. If all symbols were transmitted, the process returns to step 1805 to load the symbols of another message. If not, the process returns to step 1810 to shift another symbol to the enable pins of the circular buffers 1625, 1630, 1635 and transmit the symbol as described above.

Figure 19:
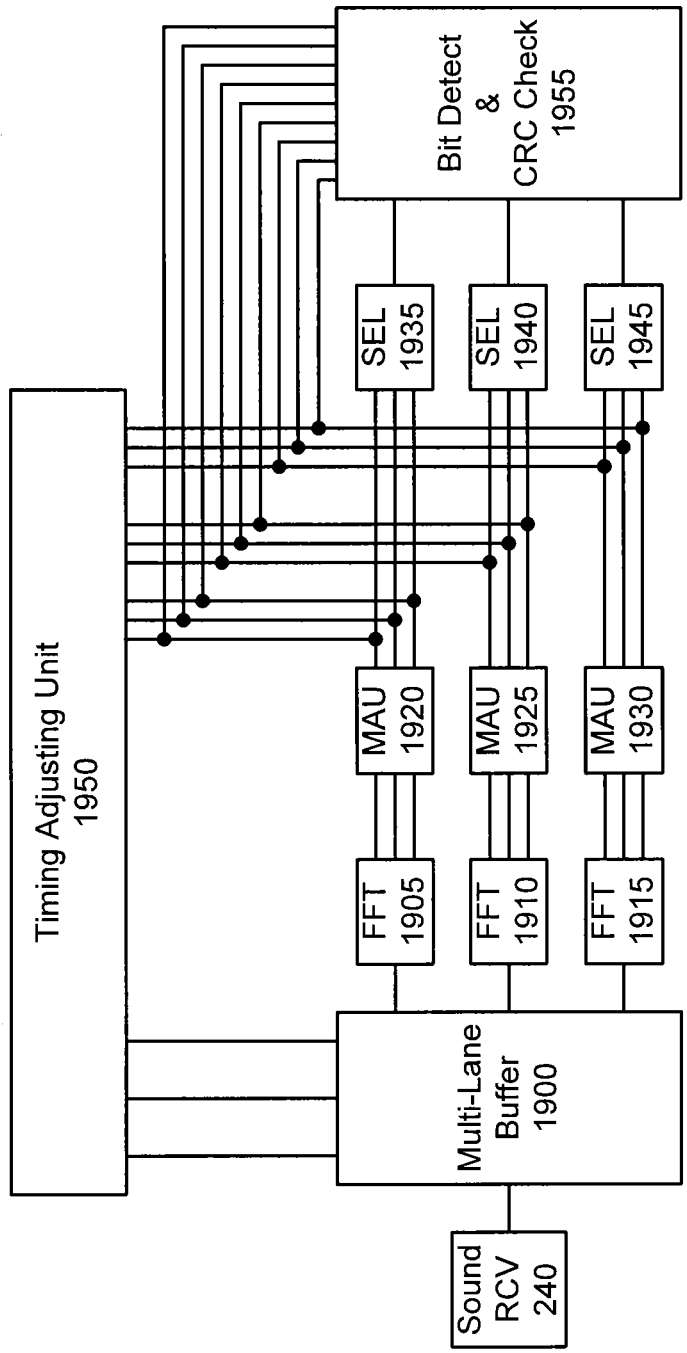
FIG. 19 is a block diagram of a terminal device according to other exemplary aspects of the present disclosure.

FIG. 19 is an exemplary block diagram for a terminal device 30 that receives ultrasound messages transmitted as a series of symbols as described above. In FIG. 19, the sound receiving unit 240 receives the ultrasound frequency sweeps for f0, f1 and f2 and converts these sweeps into digital signal samples. As can be appreciated, conversion of sound waves to digital signals at minimum involves converting the sound to an electric signal, filtering the electric signal and sampling the electric signal. However, further detail of these processes are omitted for the sake of brevity.

The output of the sound receiving unit 240 is connected to a multi-lane buffer 1900 that has one lane for every symbol bit. For example, the multi-lane buffer 1900 may have three lanes for a three-bit symbol that is transmitted as described above. The length of each lane of the multi-lane buffer 1900 is such that each lane may encompass samples corresponding to an entire frequency sweep and a corresponding guard interval. For example, if each sweep has a duration of 6 ms and each sweep is transmitted at 10 ms intervals, each lane in the multi-lane buffer 1900 may have sufficient length to encompass 10 ms of samples. Of course, the multi-lane buffer 1900 may be longer or shorter depending on sampling rate, sweep transmit intervals, sampling resolution, etc. Each lane in the multi-lane buffer 1900 is offset with respect to adjacent lanes by an offset equal to the interval between transmission of adjacent frequency sweeps. For example, if the sweeps for f0, f1, f2 are transmitted at 10 ms intervals, then each lane in the multi-lane buffer 1900 is offset with respect to adjacent lanes by 10 ms.

Each lane in the multi-lane buffer 1900 is also connected to a corresponding FFT unit 1905, 1910, 1915 which performs an FFT on the respective lane to determine an energy spectrum thereof. This may be done as an overall energy content, or may be calculated for individual regions, each centered on one of the frequencies f0, f1, f2. The outputs of the FFT units 1905, 1910, 1915 are connected to moving average units 1920, 1925, 1930 that calculate a moving average of the energy for each frequency f0, f1, f2 for each lane. The outputs of the moving average units 1920, 1925, 1930 are connected to selectors 1935, 1940, 1945 that select one of the frequencies f0, f1, f2 which will be detected by its corresponding lane based on the moving average of the energy content for each frequency f0, f1, f2. Specifically, each selector 1935, 1940, 1945 selects a frequency f0, f1, f2 that has a highest moving average energy.

The output of the selectors 1935, 1940, 1945 are connected to a bit detect and CRC check module 1955 in which the symbols are recovered. The bit detect and CRC check module 1955 compares the frequency f0, f1, f2 assigned to each lane to its corresponding moving average energy plus a predetermined constant. For example, if the energy level for the frequency f0 is above the corresponding moving average value plus the predetermined constant, the corresponding bit is assigned a value of one, otherwise the corresponding bit is assigned a value of zero. Once the bit values are determined and the symbols recovered, a checksum is computed and compared to a CRC code transmitted in the ultrasound message in order to determine whether the received message is valid. The moving average energy values are also provided to the bit detect and CRC check module 1955 as a way of corroborating a determination of a bit value or whether the corresponding message is valid. As bit detection and message recovery have been described above in detail, further description is omitted here for the sake of brevity.

The moving average values calculated by the moving average units 1920, 1925, 1930 are also provided to a timing adjusting unit 1950 which uses the values to make fine timing adjustments to the lanes in order to maximize the moving average values. For example, the timing adjusting unit 1950 may advance the lanes by a predetermined number of samples or may retard the lanes by a predetermined number of samples based on a corresponding moving average. The predetermined number of samples may be calculated by the timing adjusting unit 1950 to maximize the moving average energy values in a minimum number of iterations, or may be a fixed value that is successively applied over several iterations. The timing adjusting unit 1950 may also apply continuous corrections or may wait for a moving average energy value to drop below a predefined threshold before making a correction. In making the adjustment, the timing adjusting unit 1950 applies the same correction to all lanes at once. The timing adjusting unit 1950 may also use any maximization or minimization algorithm, such as least squares, root mean square, mean square, etc. As such, the particular implementation of the timing adjusting unit is not limiting upon the present disclosure.

Figure 20:
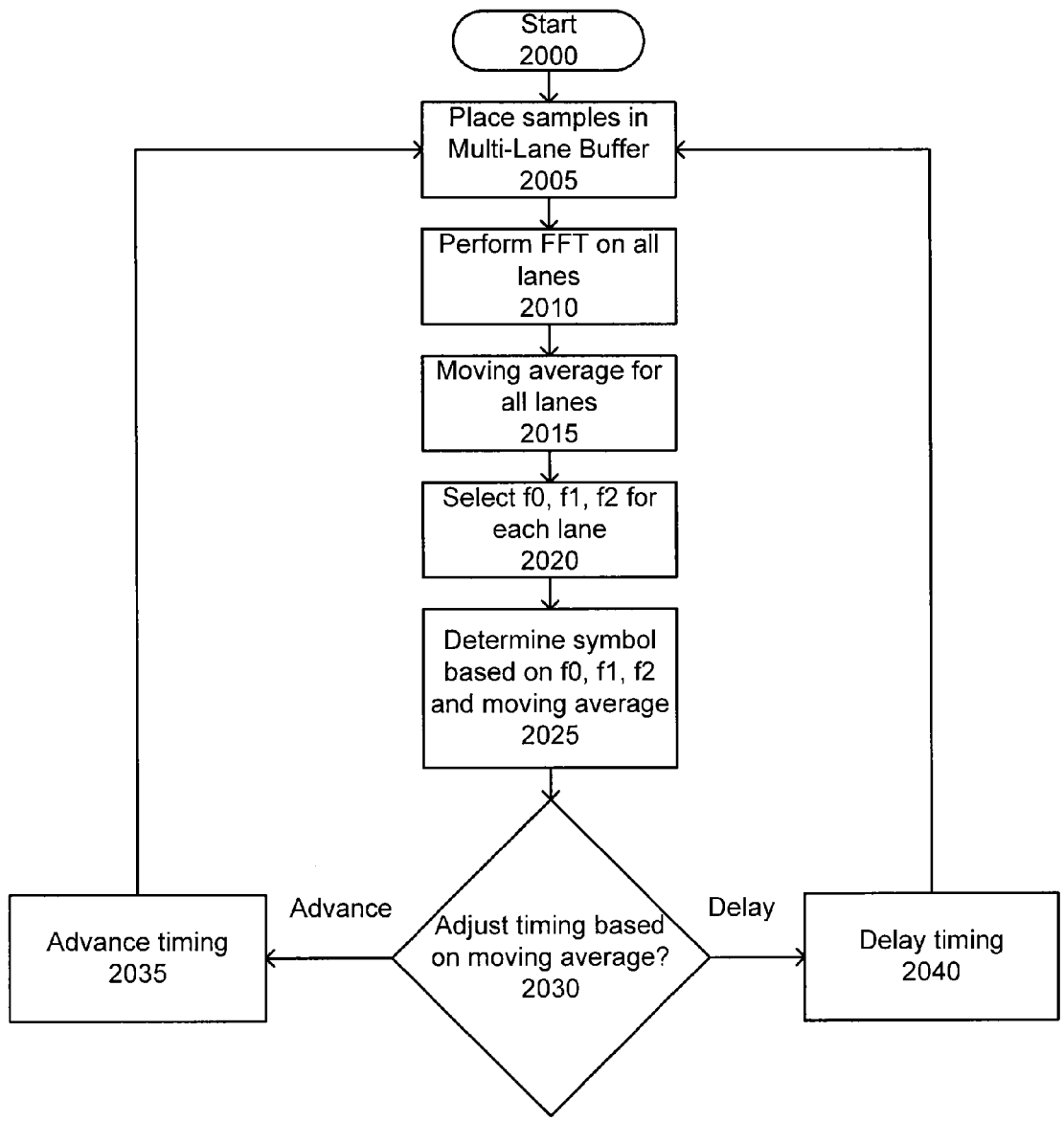
FIG. 20 is a flowchart of an ultrasound reception process according to other exemplary aspects of the present disclosure.

Next a process for receiving and decoding symbols via ultrasound according to aspects of the present disclosure is described with reference to the flowchart of FIG. 20. The process begins at step 2000 and proceeds to step 2005 where a received sample is placed in each of the lanes of the multi-lane buffer 1900. At step 2010 an FFT is performed on each lane and at step 2015 a moving average of the energy for each frequency f0, f1, f2. A frequency f0, f1, f2 is selected for each lane based on the moving average values at step 2020, and the symbols (and ultrasound message) are determined at step 2025.

Whether to adjust the timing of the lanes by delaying or advancing the timing of the lane is determined when the current moving average values exceed the previous ones at step 2030. If the timing is to be advanced, the process moves to step 2035 where input and output pointers of all lanes are adjusted accordingly, and then the process returns to step 2005. Conversely, if the timing of the lanes is to be delayed, the process moves to step 2040 where the pointers of the lanes are adjusted to introduce the appropriate delay, and then the process reverts to step 2005. As can be appreciated the timing adjustment may be performed on each lane of the multi-lane buffer 1900 independently, and may be performed sequentially (i.e., one lane at a time) or in parallel (i.e., all lanes simultaneously).

Next, an exemplary timing adjustment is described with respect to FIG. 21. In FIG. 21 two symbols A, B both having the same value, binary 7 (111), are transmitted. The lane timings for symbol A are such that the sweeps 2100, 2105 and 2110 are received towards the rear of each bit time slot. This results in a less than maximum value for the moving average of the energy for each sweep. Therefore, the timing adjusting unit 1950 may adjust the lane timings by advancing the input and output pointers of each lane so that the next received symbol B has sweeps 2115, 2120 and 2125 that fall at or near the center of each bit time slot. This timing adjustment is made in the period T1.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Moreover, any units, modules in block diagrams may be implemented by electronic circuitry with discrete components, such as transistors, resistors, inductors, diodes and capacitors, or in integrated circuit devices, such as application specific integrated circuits (ASICS), field programmable gate arrays (FPGA), or programmable or complex programmable logic devices (PLD, CPLD) as would be understood by those of skill in the art.

Obviously, numerous modifications and variations of the present invention are possible in light of the above teachings. It is therefore to be understood that within the scope of the appended claims, the invention may be practiced otherwise than as specifically described herein.

The invention claimed is:

1. A method, comprising:
receiving, at a sound receiving unit, a plurality of ultrasound frequency sweeps, each of the plurality of ultrasound frequency sweeps being centered on one of at least two predetermined frequencies and extending for a frequency offset around the at least two predetermined frequencies;
converting the plurality of ultrasound frequency sweeps into an ultrasound message based on a central frequency of each of the plurality of ultrasound frequency sweeps received;
placing the ultrasound message into a receive buffer;
extracting at least a network address from the ultrasound message; and
establishing a communication session over a data network with a telecommunications device using the network address.

2. A method, comprising:
receiving, at a sound receiving unit, a plurality of ultrasound frequency sweeps, each of the plurality of ultrasound frequency sweeps being centered on one of at least two predetermined frequencies;
converting the plurality of ultrasound frequency sweeps into an ultrasound message based on a central frequency of each of the plurality of ultrasound frequency sweeps received;
placing the ultrasound message in each of at least three lanes of a receive buffer, each lane of the receive buffer being shifted by a predetermined amount relative to the other lanes;
selecting a lane of the at least three lanes as a lane including the ultrasound message data based on an energy value calculated for each lane;
extracting at least a network address from the selected lane of the ultrasound message; and
establishing a communication session over a data network with a telecommunications device using the network address.

3. The method of claim 2, further comprising:
calculating a Fast Fourier Transform of each of the at least three lanes to determine the energy value for each lane; and
selecting a lane having a highest energy value.

4. The method of claim 3, further comprising:
decoding the ultrasound message bits by determining energy values for the plurality of ultrasound frequency sweeps at the at least two predetermined frequencies;
setting the ultrasound message data as a logic high when an energy value for a higher of the at least two predetermined frequencies is higher than an energy value for a lower of the at least two predetermined frequencies; and
setting the ultrasound message data as a logic low when the energy value for the higher of the at least two predetermined frequencies is lower than the energy value for the lower of the at least two predetermined frequencies.

5. The method according to claim 3, further comprising:
filtering an output of the Fast Fourier Transform in a median filter prior to selecting the lane having the highest energy value.

6. A terminal device, comprising:
a sound reception circuitry to receive a plurality of ultrasound frequency sweeps, each of the plurality of ultrasound frequency sweeps being centered on one of at least two predetermined frequencies;
a bit detector to determine bit values corresponding to the ultrasound message based on a central frequency of each of the plurality of ultrasound frequency sweeps and an energy value for the plurality of ultrasound frequency sweeps;
a message buffer to store the bit values corresponding to the ultrasound message; and
a network interface to establish a communication session via a data network with another device based on a network address extracted from the message buffer.

7. The terminal device according to claim 6, further comprising:
a multi-lane buffer to store the ultrasound message in at least three lanes, each of the at least three lanes being offset relative to the other of the at least three lanes by a predetermined offset;
a Fast Fourier Transform circuitry to generate energy values for each of the at least three lanes of the multi-lane buffer, wherein
the bit detector selects a lane of the at least three lanes which has a highest energy as a lane including valid ultrasound message data and determines the bit values corresponding to the ultrasound message based on the selected lane.

8. The terminal device according to claim 7, wherein the message buffer includes:
a current message buffer to store the bit values determined by the bit detector,
a previous message buffer to store previous bit values,
a checksum generator to generate a checksum based on the current and previous message buffers, and
a bit inverter to invert at least one bit in at least one of the current message buffer and the previous message buffer based on the checksum.

9. The terminal device according to claim 7, wherein the Fast Fourier Transform circuitry determines energy values of the ultrasound frequency sweeps at each of the at least two predetermined frequencies for the selected lane, and the bit detector determines the bit values based on the energy values corresponding to the at least two predetermined frequencies.

10. The terminal device according to claim 7, wherein the received ultrasound message data includes multi-bit symbols, each bit value of the multi-bit symbols being represented by a presence or an absence of an ultrasound frequency sweep centered on one of the at least two predetermined frequencies.

11. The terminal device according to claim 10, further comprising:
placing the ultrasound message in a plurality of lanes of the receive buffer, each lane of the receive buffer being shifted by a predetermined amount relative to the other lanes;
assigning a bit of the multi-bit symbols to each of the at lane of the at least three lanes of the receive buffer based on a moving average energy value for each of the at least three lanes;
determining the multi-bit symbols by detecting a presence or absence of a corresponding ultrasound frequency sweep in each of the at least three lanes; and
extracting the network address from the multi-bit symbols,
wherein a value of zero is assigned to a bit when the corresponding ultrasound frequency sweep is absent and a value of one is assigned to the bit when the corresponding ultrasound frequency sweep is present.

12. A telecommunications device, comprising:
a network interface to interface to a data network;
an electronic memory to store at least a network address for communication via the network interface and the data network;
wherein a cyclic redundancy check (CRC) value is generated based on at least the network address; and
an ultrasound transmitter to transmit a message that includes the network address and the CRC value as a plurality of ultrasound frequency sweeps for a range of frequencies, each ultrasound frequency sweep being centered on one of at least two predetermined frequencies.

13. The telecommunication device according to claim 12, wherein an ultrasound frequency sweep corresponding to a higher of the at least two predetermined frequencies corresponds to a bit having a logic one value and an ultrasound frequency sweeps corresponding to a lower of the at least two predetermined frequencies corresponds to a bit having a logic zero value.

14. The telecommunications device according to claim 13, wherein a lower of the at least two predetermined frequencies is 20.8 KHz, a higher of the at least two predetermined frequencies is 21.5 kHz and the range of frequencies from −350 Hz to 350 Hz with respect to a corresponding one of the at least two predetermined frequencies.

15. The telecommunication device according to claim 14, wherein the ultrasound transmitter transmits no frequencies for a predetermined duration between transmission of successive ultrasound frequency sweeps.

16. The telecommunications device according to claim 12, wherein the ultrasound transmitter transmits the message as a plurality of three-bit symbols, each bit being represented by an ultrasound frequency sweep centered on a different one of at least three predetermined frequencies.

17. The telecommunications device according to claim 16, wherein for each bit of a three-bit symbol, the transmitter transmits a corresponding ultrasound frequency sweep when the bit has a value of one and does not transmit the corresponding ultrasound frequency sweep when the bit has a value of zero.

18. A method, comprising:
storing a network address for communicating via a data network in an electronic memory;
generating a cyclic redundancy check (CRC) value based on at least the network address;
transmitting a message including the network address and the CRC value ultrasonically, via an ultrasound transmitter, as a plurality of ultrasound frequency sweeps, each ultrasound frequency sweep being centered on one of at least two predetermined frequencies and extending for a frequency offset; and
communicating with another device via the data network in response to receipt of a message from the other device addressed to the network address.

19. A non-transitory computer-readable medium storing computer-readable instructions thereon, the computer-readable instructions when executed by a processor cause the processor to perform a method comprising:
storing a network address for communicating via a data network in an electronic memory;
generating a cyclic redundancy check (CRC) value based on at least the network address;
transmitting a message including the network address and the CRC value ultrasonically as a plurality of ultrasound frequency sweeps, each ultrasound frequency sweep being centered on one of at least two predetermined frequencies and extending for a frequency offset; and
communicating with another device via the data network in response to receipt of a message from the other device addressed to the network address.

20. A non-transitory computer-readable medium storing computer-readable instructions thereon, the computer-readable instructions when executed by a processor cause the processor to perform a method comprising:
receiving a plurality of ultrasound frequency sweeps, each of the plurality of ultrasound frequency sweeps being centered on one of at least two predetermined frequencies and extending for a frequency offset;
converting the plurality of ultrasound frequency sweeps into an ultrasound message based on a central frequency of each of the plurality of ultrasound frequency sweeps received;
placing the ultrasound message into a receive buffer;
extracting at least a network address from the ultrasound message; and establishing a communication session over a data network with a telecommunications device using the network address.

* * * * *